United States Patent
Ruffini et al.

(10) Patent No.: US 10,892,997 B2
(45) Date of Patent: Jan. 12, 2021

(54) SCHEDULING OF DATA FLOW TRANSMISSION IN A DATA CENTER

(71) Applicant: Telefonaktiebolaget LM Ericsson (publ), Stockholm (SE)

(72) Inventors: Stefano Ruffini, Pisa (IT); Giulio Bottari, Pisa (IT)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 91 days.

(21) Appl. No.: 16/307,211

(22) PCT Filed: Jun. 10, 2016

(86) PCT No.: PCT/EP2016/063370
§ 371 (c)(1),
(2) Date: Dec. 5, 2018

(87) PCT Pub. No.: WO2017/211431
PCT Pub. Date: Dec. 14, 2017

(65) Prior Publication Data
US 2019/0199644 A1    Jun. 27, 2019

(51) Int. Cl.
*G06F 15/16*   (2006.01)
*H04L 12/841*  (2013.01)
*H04L 12/801*  (2013.01)
*H04L 12/807*  (2013.01)
*H04L 12/823*  (2013.01)
*H04Q 11/00*   (2006.01)

(52) U.S. Cl.
CPC ............ *H04L 47/283* (2013.01); *H04L 47/18* (2013.01); *H04L 47/27* (2013.01); *H04L 47/32* (2013.01); *H04Q 11/0062* (2013.01)

(58) Field of Classification Search
CPC ......... H04L 47/10; H04L 47/18; H04L 47/28; H04L 47/50; H04L 47/283; H04L 47/564; H04L 47/2408; H04Q 2011/0064
See application file for complete search history.

(56) References Cited

U.S. PATENT DOCUMENTS

| | | | |
|---|---|---|---|
| 2002/0122228 A1* | 9/2002 | Rappaport | H04L 45/22 398/98 |
| 2010/0284421 A1* | 11/2010 | Fourcand | H04L 47/10 370/458 |
| 2016/0127246 A1 | 5/2016 | Ashwood-Smith et al. | |

(Continued)

OTHER PUBLICATIONS

Adaptive Path Isolation for Elephant and Mice Flows by Exploiting Path Diversity in Datacenters by Wei Wang et al.; IEEE Transactions on Network and Service Management, vol. 13, No. 1—Mar. 2016.

(Continued)

*Primary Examiner* — Yves Dalencourt
(74) *Attorney, Agent, or Firm* — Sage Patent Group

(57) ABSTRACT

A method of scheduling transmission of a data flow in a data center network comprising a plurality of network nodes and links. The method comprising, at a network controller receiving (14) a transmission request for a data flow, obtaining (15) a tolerated time interval for the data flow, and scheduling (16) transmission of the data flow within the tolerated time interval and without contention with other transmissions.

14 Claims, 25 Drawing Sheets

(56) References Cited

U.S. PATENT DOCUMENTS

2016/0127250 A1   5/2016   McCormick et al.

OTHER PUBLICATIONS

Optimizing the Resource Utilization of Datacenter Networks With Openflow by Liu Bo et al., College of Command Information Systems, PLA university of Science and Technology, Nanjing, 210007, China; New Era Software Defined Network; China Communications—Mar. 2016.

International Search Report for International application No. PCT/EP2016/063370—dated Mar. 6, 2017.

* cited by examiner

SCHEDULING OF DATA FLOW TRANSMISSION IN A DATA CENTER

PRIORITY

This nonprovisional application is a U.S. National Stage Filing under 35 U.S.C. § 371 of International Patent Application Serial No. PCT/EP2016/063370 filed Jun. 10, 2016, and entitled "Scheduling of Data Flow Transmission in a Data Center" is hereby incorporated by reference in its entirety.

TECHNICAL FIELD

The field of the disclosure is scheduling of data flow transmission.

BACKGROUND

Data centers or large clusters of servers have become increasingly employed in universities, enterprises and consumer settings to run a variety of applications such as web services, instant messaging, gaming, data analysis, scientific computing and many others. Data centers typically comprise many thousands of servers arranged hierarchically, typically with racks containing 10-40 servers each, linked by a Data Center Network (DCN). FIG. 1 is a schematic diagram of a traditional data center network. The data center 1 comprises a link to external networks 2, servers 6 and a switching hierarchy 7 comprising core routers 3, access routers 4, switches 5 cross point switches 8.

A major problem in such networks lies in large data flows, known as high bandwidth or "elephant flows", which typically originate from server back-up or virtual machine migration. Elephant flows are comparatively rare, but when they are present, they can dominate a data center network at the expense of smaller so-called "mice flows". This can have a highly detrimental effect on the quality of service of mice flows, which are typically delay sensitive.

FIG. 2 is a graphical representation of "elephant" and "mice" flows. The graph shows link utilization 9 against time 10, with mice flows 11 below a load threshold 12 and elephant flows 13 above the load threshold. The "elephant" attribute may refer to flows that overcome a rate threshold, a volume threshold, a duration threshold either in absolute terms or as in relation to other flows transmitted over a shared path or shared network or shared machine. Thresholds can be fixed and predetermined or dynamically adjusted according to the overall traffic trends or statistics. Although of short duration and relatively rare, elephant flows cause major problems as they dominate the network and are highly detrimental to delay and delay variation in smaller flows.

Building a non-blocking "packet only" network in a data center is extremely challenging with elephant flows tending to fill buffers in the nodes along the server-to-server path. This introduces non-negligible queuing delays to anything that shares the same buffers, especially to latency-sensitive small packet flows.

One solution to this problem is the use of "packet offload", wherein a separate network is provided for elephant flows. Offload enables transit traffic to optically bypass intermediate packet processing entirely, resulting in reduced required capacity and optimized power consumption. Moreover, capacity of optical channels allows accommodating bandwidth hungry data transfers.

In addition to providing for the size of data in elephant flows, it is increasingly important to consider timing aspects of such flows. Time synchronization in data centers is of increasing importance. This is typically driven by the deployment of distributed systems. Synchronization is required to cater for latency critical applications and for optimizing power/cost. Some 5G applications favor distributed functionality and require support for strict latency requirements down to a few milli-seconds (ms). Furthermore, they may require support for massive amount of local traffic and distribution of control functionality to enable stand-alone operation.

Another example is in the finance industry where in particular High-Frequency Trading (HFT) requires accurate time-stamping of trades for accurate records of transactions during playback regression to improve trading algorithms, for reporting and regulatory purposes, disputes, etc. Here the requirement is generally in the sub-microsecond range.

In terms of solutions, the GPS has primarily been used for this type of applications but it now faces issues: coverage, signal loss and security (e.g. due to jamming attacks) are significant and expensive issues. As a consequence, the use of IEEE 1588 is receiving a lot of interest as timing information can be delivered via an Ethernet network. A specific IEEE 1588 profile has been defined in the Internet Engineering Task Force (IETF) for Enterprise applications.

Solutions able to deliver accuracy in the microsecond range in the datacenters are expected to be widely available and at affordable cost.

In such systems, simple scheduling arrangements designed for the small number of elephant flows will not suffice to ensure that data flows are transmitted efficiently. Where large numbers of elephant flows, often with time critical data require transmission, conventional scheduling methods are inadequate and fail to provide transmission for data flows within their delay tolerances.

SUMMARY

In a first aspect there is provided a method of scheduling transmission of a data flow in a data center network comprising a plurality of network nodes and links. The method comprises, at a network controller receiving a transmission request for a data flow, obtaining a tolerated time interval for the data flow, and scheduling transmission of the data flow within the tolerated time interval and without contention with one or more other transmissions on the data center network.

In an embodiment, the method further comprises identifying the originating node and terminating node, identifying a set of the nodes and a set of links, through which the data flow is to be routed, determining the delays associated with the nodes and links between the nodes, determining a tolerated time interval for the data flow for each link and node in the set of links, the determining based on the delays associated with the nodes and links, and an initial tolerated time interval at a client server for the data flow, and scheduling the transmission of the data flow at each link and node based on the tolerated time interval for the link.

In an embodiment, the transmission request comprises an indication of a size of a required transmission, an initial tolerated time interval, an indication of originating node and an indication of at least one terminating node.

In an embodiment, the scheduling comprises determining a division of the data flow into a plurality of segments for transmission of the data flow within the tolerated time interval and without contention.

In an embodiment, the method further comprises scheduling the transmission of data flow such that the data flow or the segments of the data flow are separated by one or more guard periods from another data flow on the communications network.

In an embodiment, the data flow is a high bandwidth flow, wherein the high bandwidth data flow is a data flow with a bandwidth requirement greater than a threshold, wherein the guard period is dimensioned to allow for transmission of low bandwidth flows, wherein a low bandwidth flow is a data flow with a bandwidth below the threshold.

In an embodiment, the method further comprises determining a path through the network to avoid contention with other data flows.

In an embodiment, the data center network comprises an optical offload subnetwork and scheduling data flows on the optical offload subnetwork is implemented according to any preceding claim.

In an embodiment, the data center network comprises a second subnetwork comprising at least one switch or router, wherein the method further comprises scheduling the data flow on the second subnetwork if no scheduling without contention is possible on the optical offload subnetwork.

In an embodiment, the method further comprises, at a network node, receiving an instruction relating to a data flow from the network controller. If the instruction comprises an instruction to transmit the data flow as a single block, the method further comprises extracting from the instruction a start time for transmission of the data flow and initiating transmission of the data flow at the start time. If the instruction comprises an instruction to divide the data flow into segments, the method further comprises initiating division of the data flow into segments and receiving instructions comprising segment start times, extracting from the instructions respective start times for each segment and initiating transmission of each segment at a respective start time.

In an embodiment, the method further comprises determining or receiving for a data flow a size of a required transmission, an initial tolerated time interval, and at least one terminating node, and sending to the network controller a transmission request for the data flow, the request comprising the size of the required transmission, the initial tolerated time interval indication, an indication of the originating node and an indication of the at least one terminating node.

According to a second aspect, there is provided a network controller for a data center network comprising a first interface for receiving requests for transmission of a data flow, a second interface for transmitting instructions for transmission of a data flow, a processor, and a memory. The network controller is configured to receive a transmission request for a data flow, obtain a tolerated time interval for the data flow, and schedule transmission of the data flow within the tolerated time interval and without contention with other transmissions.

In an embodiment, the network controller is further configured to identify the originating node and terminating node, identify a set of the nodes and a set of links, through which the data flow must pass, determine the delays associated with the nodes and links between the nodes, determine a tolerated time interval for the data flow for each link and node in the set of links, the determining based on the delays associated with the nodes and links, and an initial tolerated time interval for the data flow, and schedule the transmission of the data flow at each link and node based on the tolerated time interval for the link and the size of the transmission.

In an embodiment, the network controller is further configured to schedule transmission based on a division of the data flow into a plurality of segments.

In an embodiment, the network controller is further configured to schedule guard periods between the data flow or the segments of the data flow and other data flows on the communications network.

In an embodiment, the network controller is further configured to determine a path for the data flow through the network to avoid contention with other data flows.

According to a third aspect there is provided a data center network comprising a network controller according to the second aspect.

According to a fourth aspect there is provided an apparatus for use in a network node in a data center network comprising a transmitter for transmitting data to the communications network, a receiver for receiving data from the communications network, a first interface for exchanging data with at least one data source, a second interface for exchanging control data with a network controller. The apparatus is configured to receive an instruction relating to a data flow from the network controller. The apparatus is further configured if the instruction comprises an instruction to transmit the data flow as a single block, to extract from the instruction a start time for transmission of the data flow, and initiate transmission of the data flow at the start time. The apparatus is further configured to, if the instruction comprises an instruction to divide the data flow into segments, initiate division of the data flow into segments, receive instructions comprising segment start times, extract from the instructions respective start times for each segment, and initiate transmission of each segment at a respective start time.

In an embodiment, the apparatus is further configured to determine or receive a size of a required transmission, an initial tolerated time interval and at least one terminating node for a data flow and send to the network controller a transmission request for the data flow, the request comprising the size of the required transmission, the initial tolerated time interval, an indication of the originating node and an indication of the at least one terminating node.

In an embodiment, the apparatus further comprises a transceiver for connection to a second communications network. The apparatus further configured to receive an instruction to transmit a data flow on the second communications network, and in response to receipt of the instruction initiate transmission on the second network.

In an embodiment, the apparatus is further configured to insert a guard band prior to transmission of a data flow or a segment of a data flow.

In a fifth aspect there is provided a data center network comprising an apparatus according to the fourth aspect.

In a sixth aspect, there is provided computer program, comprising instructions which, when executed on at least one processor, cause the at least one processor to carry out a method according to the first aspect.

In a seventh aspect, there is provided a computer program product comprising a computer program according to the sixth aspect.

In a eight aspect, there is provided a carrier containing the computer program product according to seventh aspect, wherein the carrier optionally includes an electrical signal, an optical signal, a radio signal, a magnetic tape or disk, an optical disk or a memory stick.

BRIEF DESCRIPTION OF THE DRAWINGS

The above and other aspects of the present invention will now be described by way of example only, with reference to the following figures.

DETAILED DESCRIPTION

Figure 1:
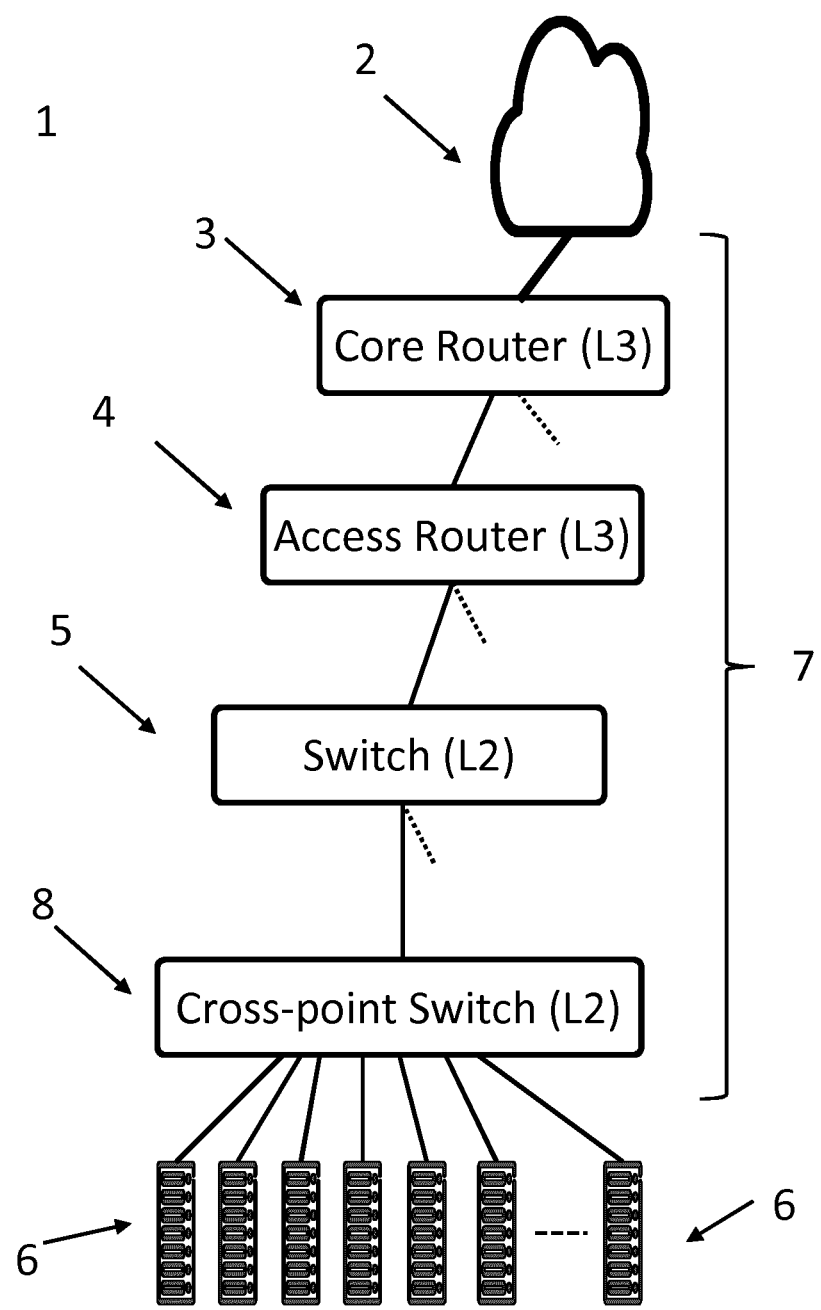
FIG. 1 is a schematic diagram of a data center network according to the prior art.
Figure 2:
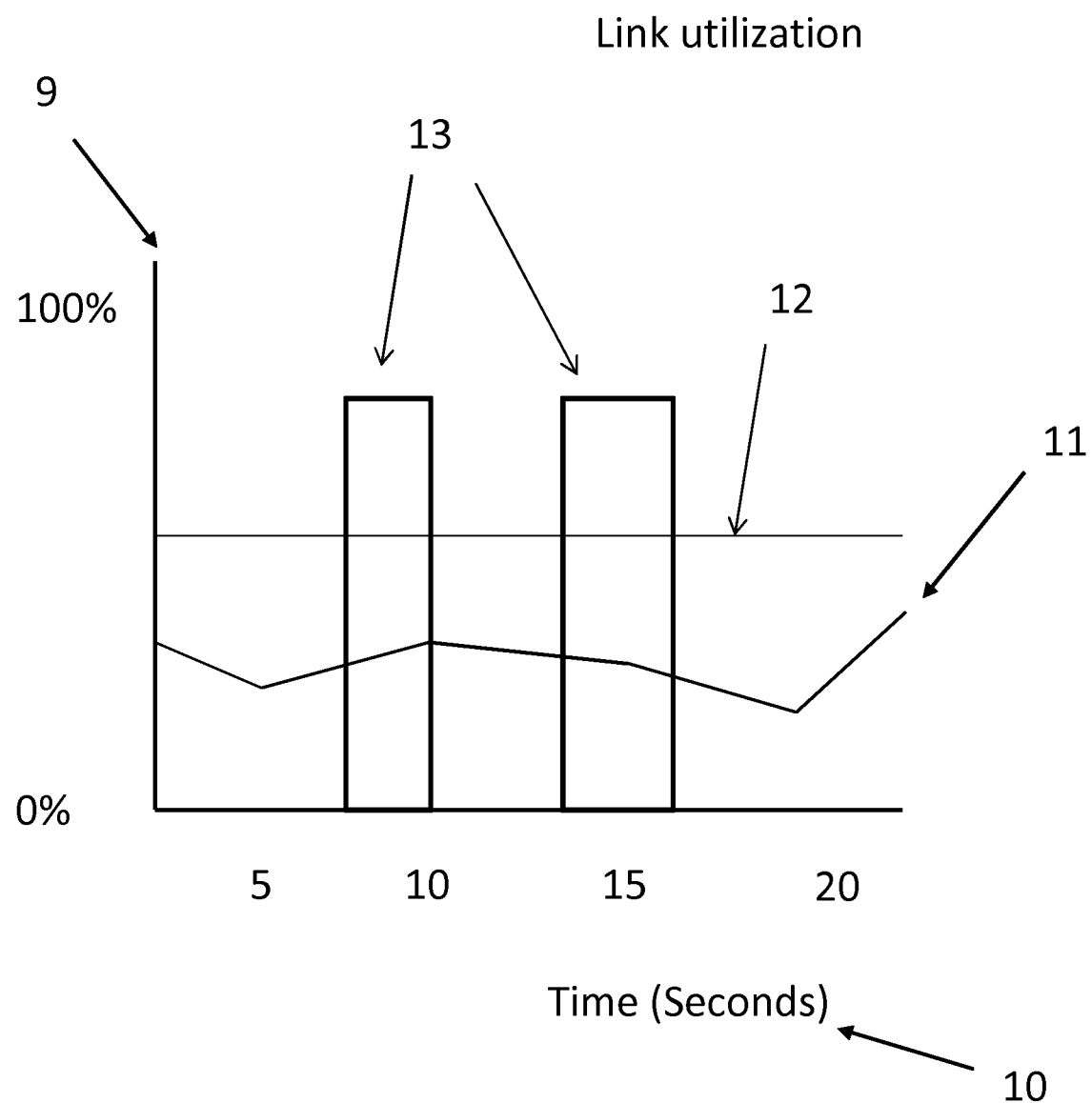
FIG. 2 is a graphical representation of network load against time showing "mice" and "elephant" flows.

Embodiments will now be described more fully hereinafter with reference to the accompanying drawings, in which certain embodiments are shown. However, other embodiments in many different forms are possible within the scope of the present disclosure. Rather, the following embodiments are provided by way of example so that this disclosure will be thorough and complete, and will fully convey the scope of the disclosure to those skilled in the art.

The present disclosure provides a method by which high bandwidth flows can be efficiently scheduled onto a data center network comprising an optical offload subnetwork. In particular, the method enables the scheduling of delay sensitive data flows.

A network controller function is used which schedules data flows centrally for the network. The network controller may be a single node in the network or may be distributed over different nodes. It may be co-located with one or more network nodes or be provided as a distinct dedicated node. The invention is not limited to any one arrangement of network controller.

The network controller is aware of all current and scheduled transfers and can determine if the transmission of a data flow can be activated by reserving a sequence of synchronized "zero-queues" transmission resources on at least one path from a source server to the destination server. In an embodiment, this is made possible by periodically pre-assigning time slots to the client servers and predicting the instantaneous resource usage on each link. In order to schedule accurately, each server is synchronized to the network by provision of an accurate time reference. Latencies in links and nodes are also known to allow determination of tolerated time intervals for a data flow. Based on said known latencies, the controller determines how the tolerated time intervals at the starting point of each flow are translated at the various intermediate network resources. By analyzing this information, the controller can define the actual departure time for each flow.

The time slot accuracy is related to the type of network. In optical networks, the switching times are in the order of milliseconds. For example, for optical networks as in FIG. 4, where optical-electrical-optical (OEO) devices are used, the switching times are in the region of 50 ms. Time slots may defined with the granularity of 50 ms where one time slot is allocated to allow the switching process and timing accuracy in the servers in the order of few ms in principle is sufficient.

Latencies in packet networks are less predictable than those in optical networks. In an embodiment, low bandwidth flows are not transmitted on the optical offload network, meaning that delays due the presence of small packet flows are not present. Typically, accuracies in the order of microseconds are required in the conventional packet networks to enable better allocation of resources. In an embodiment, in some instances in a conventional packet based network, it may be necessary to assume a constant latency for a node and use a fixed value in the delay calculations. The invention is not limited to any one method of determining node latencies nor to any one granularity of timeslot.

In an embodiment, with the assumption that link is symmetric in both transmission directions, a round-trip-based calculation method, operating between neighbor nodes can be used to evaluate the link delay. Standard protocols such as peer delay measurement mechanisms as per IEEE1588 could be used. The node latencies can be calculated by means of simple counters that timestamp data at the in-out interfaces. Relatively simple oscillators are sufficient for this task.

Upon the determination that a high bandwidth data flow needs to be scheduled, a request is made to a network controller. Upon receipt of the request, the network controller will obtain a tolerated time interval for the data flow and hence determine whether it is possible to schedule the data flow within a tolerated time interval and without contention with other data flows being transmitted or having been scheduled to be transmitted on the network. In an embodiment, the tolerated time interval will be provided in the request. Typically, the request contains the size of the data flow, the originating node and the terminating node. However, the person skilled in the art will appreciate that each of these items may be obtained by other methods.

Figure 3:
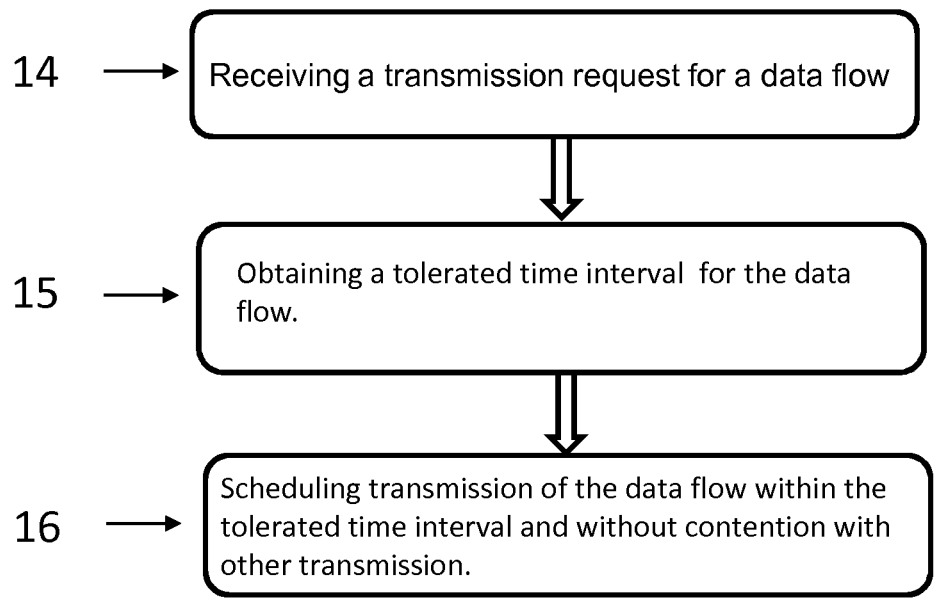
FIG. 3 is a flow chart of a method of scheduling data flows according to an embodiment.

FIG. 3 is a flow chart illustrating the steps of a method according to an embodiment. A transmission request for a data flow is received 14, and a tolerated time interval is obtained 15. The tolerated time interval may be obtained by receiving an indication of the time interval from the server 6 (e.g. along with the transmission request), from a memory or storage of the controller or from another network entity. Transmission of the data flow within the tolerated time interval and without contention is scheduled 16.

In an embodiment, the determination as to whether such a schedule is possible is made by determining, at the network controller, a route for the transmission of the data flow. This determining comprises identifying nodes and links which provide a route between the originating and the terminating nodes of the data flow. In an embodiment, if the network comprises a simple unidirectional ring topology, the nodes through which the data flow must pass may be determined by the identifying the originating and terminating nodes. However, the skilled person will appreciate that other topologies may be used for the network, in which routing decisions must be made in conjunction with scheduling decisions. In an embodiment, a mesh network is used and a routing algorithm is required in conjunction with the temporal scheduling.

Figure 4:
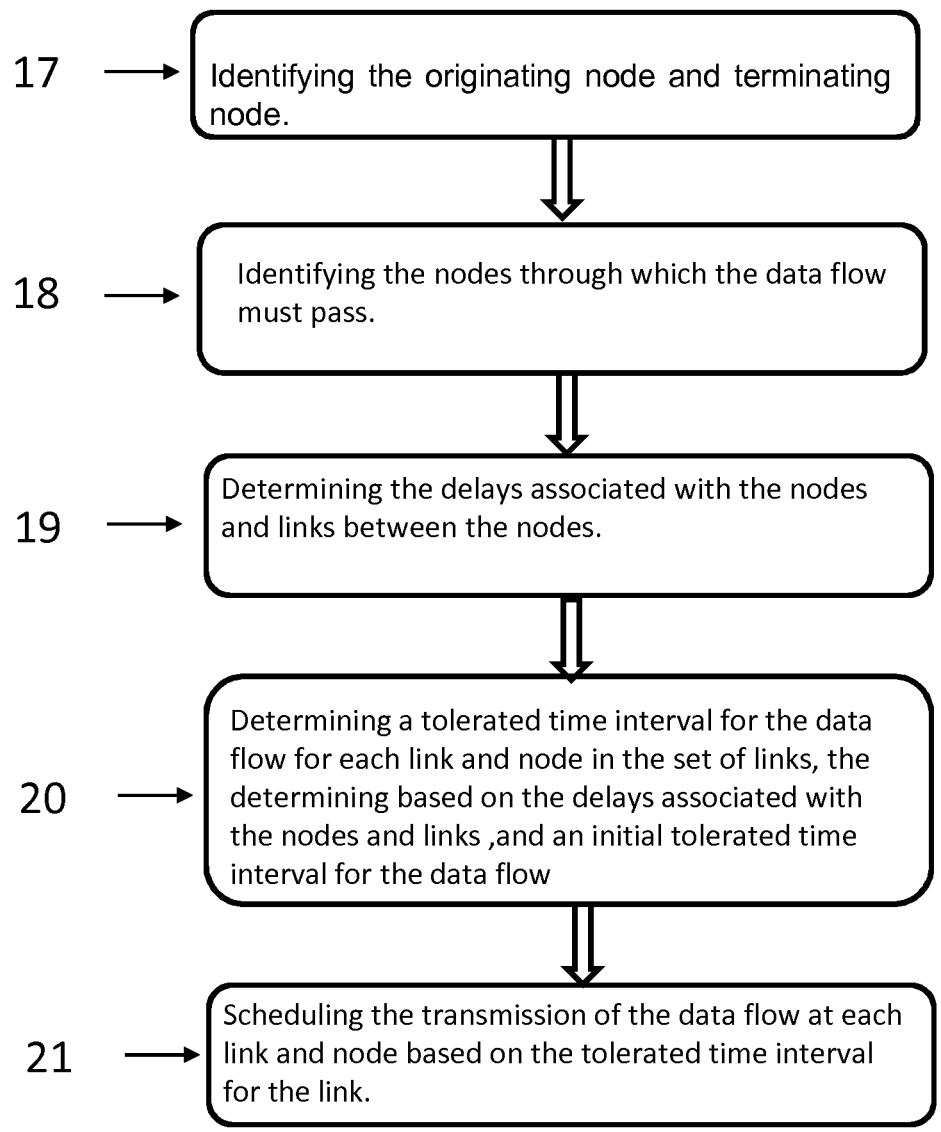
FIG. 4 is a flow chart of a method of scheduling data flows according to an embodiment.

FIG. 4 is a flow chart illustrating the steps of determining the delays associated with a flow according to an embodiment. The originating node and the terminating node are identified 17, either directly from the transmission request or indirectly. The nodes through which the data flow must pass are identified 18 and delays associated with the nodes and links between them are determined 19. The method further comprise determining 20 a tolerated time interval for the data flow for each link and node in the set of links, the determining based on the delays associated with the nodes and links, and an initial tolerated time interval for the data flow, and scheduling 21 the transmission of the data flow at each link and node based on the tolerated time interval for the link.

Scheduling a transmission comprises the selection of a start time for the transmission of a data flow. The purpose is to ensure that the data flow may be transmitted within a tolerated time interval. In some aspects, the data flow is transmitted in its entirety within the tolerated time interval. Once the nodes and links are selected through which the transmission of the data will be routed, the tolerated time intervals for each data flow to be scheduled are determined for each node and link. It is determined whether there is a time window for the data flow to be transmitted and if there is, a start time is assigned to the data flow and this time is communicated to the originating node. The scheduling is performed such that there is no contention between data flows. Contention may occur when a part of the transmission path (e.g. switch, link) has a capacity to handle a data flow which is exceeded. Thus, avoiding contention is a selection of the transmission time (and optionally, the segmenting of the data flow and/or routing of the data flow) to avoid transmissions which exceed the capacity of the network.

In an embodiment, a determination is made as to whether it is possible to schedule the data flow to be transmitted as a single block. In an embodiment, the transmission is at a constant bit rate. In some examples, a determination is made as to whether the data flow may be transmitted as a single block to meeting the transmission criteria (e.g. within the tolerated time interval and avoiding contention). If it is not possible to transmit the data flow as a single block, a determination is made as to whether it is possible to divide the data flow into segments, so as to schedule the segments separately. In an embodiment, a segment size is chosen and typically a determination of the tolerated delay is made for each segment. A determination is made as to whether each segment may be scheduled for transmission within the tolerated time interval. If such a schedule is possible, instructions are sent to the node to commence transmission of the segments at prescribed start times. In an embodiment, if the segments cannot be scheduled so as to meet the required delay tolerances, a second segment size is selected and the process of determining if a schedule is possible is repeated. If necessary, an iteration through a plurality of start times may be performed. In an embodiment, different sizes of segment within the same data flow may be used.

Figure 5:
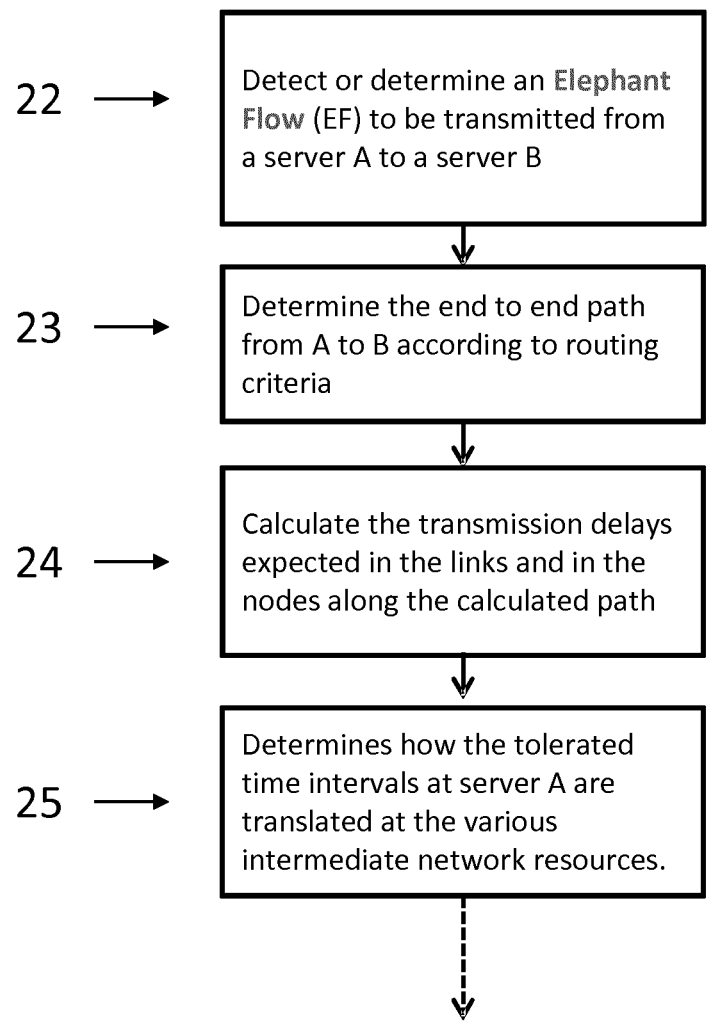
FIG. 5 is a flow chart illustrating a method of operating a network node according to an embodiment.
Figure 6:
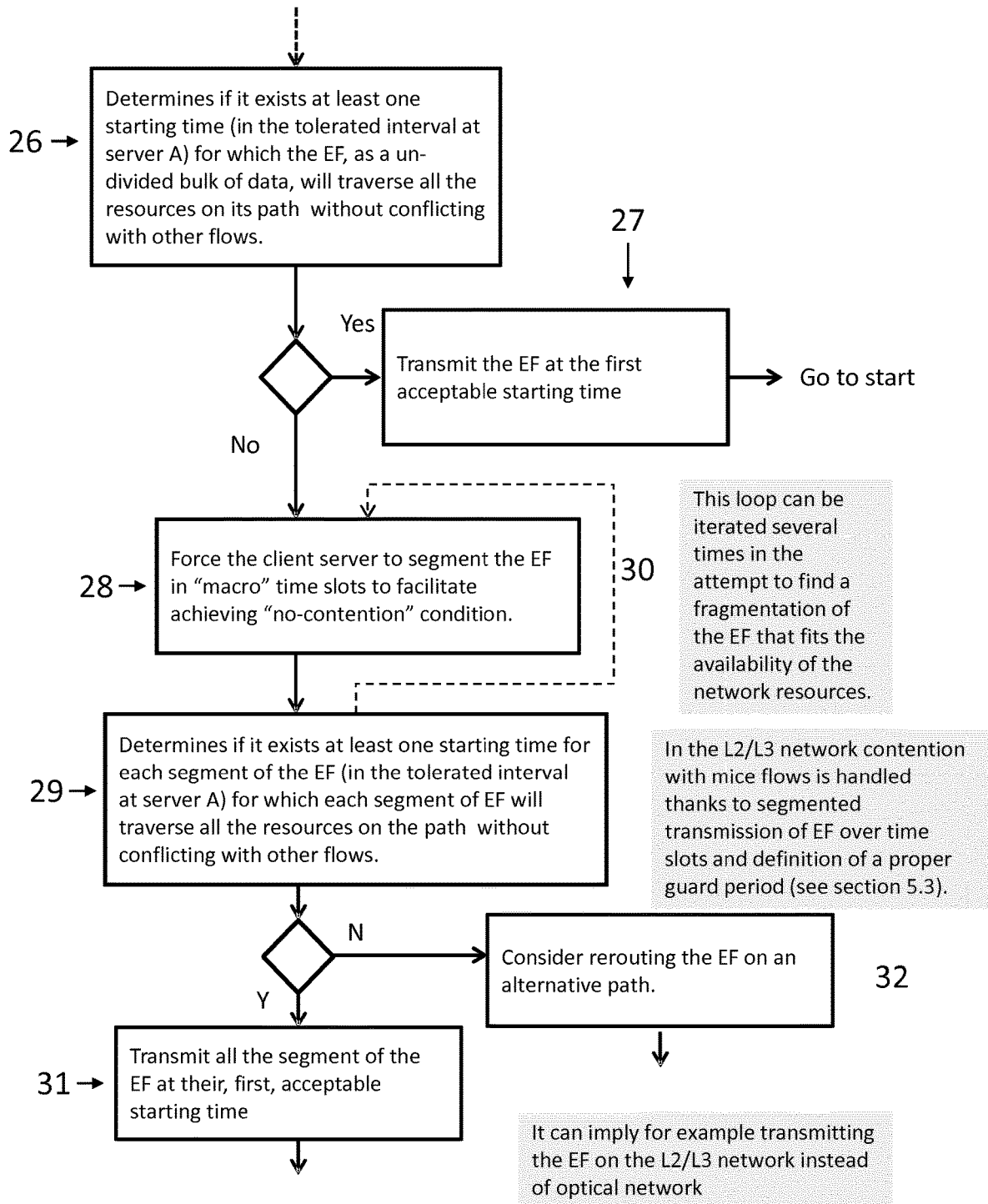
FIG. 6 is a flow chart illustrating a method of operating a network node according to an embodiment.

FIGS. 5 and 6 show the stages of scheduling according to an embodiment. In some examples, these stages are carried out in a network controller.

FIG. 5 illustrates the start of the procedure. The process begins with the detection or determining that a high bandwidth or "elephant" flow (EF) is to be transmitted from a first server (in this example "server A") to a second (in this example "server B"). An end to end path from A to B is determined for the data flow according to routing criteria for the data flow 23. The transmission delays expected for the links and the nodes in the end-to-end path are calculated 24. A determination is then made 25 as to how the tolerated time intervals at server A are translated at the various intermediate network resources.

FIG. 6 illustrates the continuation of the procedure. A determination is made as to whether there exists at least one starting time (in the tolerated interval at server A) for which the data flow (EF), as an un-divided bulk of data, will traverse all the resources on its path without conflicting with other flows. If there is, the data flow (EF) is transmitted at the first acceptable start time 27. If there is not, the client server is forced to segment the data flow (EF) into "macro" time slots to facilitate achieving the "no-contention" condition 28. A determination is then made 29 as to whether there exists at least one starting time for each segment of the data flow (EF) (in the tolerated interval at server A) for which each segment of data flow (EF) will traverse all the resources on the path without conflicting with other flows. In an embodiment, different fragmentations of the data flow (EF) may be tried to determine a satisfactory segmentation. An iteration through different segment sizes may be performed 30 to achieve this aim. If there exists a suitable segment size, then the segments are transmitted at their first acceptable start time 31. If no such segmentation is possible, then rerouting 32 of the data flow (EF) is considered, for example a different route on optical offload network and/or the transmission of the flow on a conventional subnetwork. The controller determines whether a different route or network may carry the data flow and meet the transmission criteria, i.e. tolerated time interval. If such an alternative route can be found, it is used for the data flow.

Figure 7:
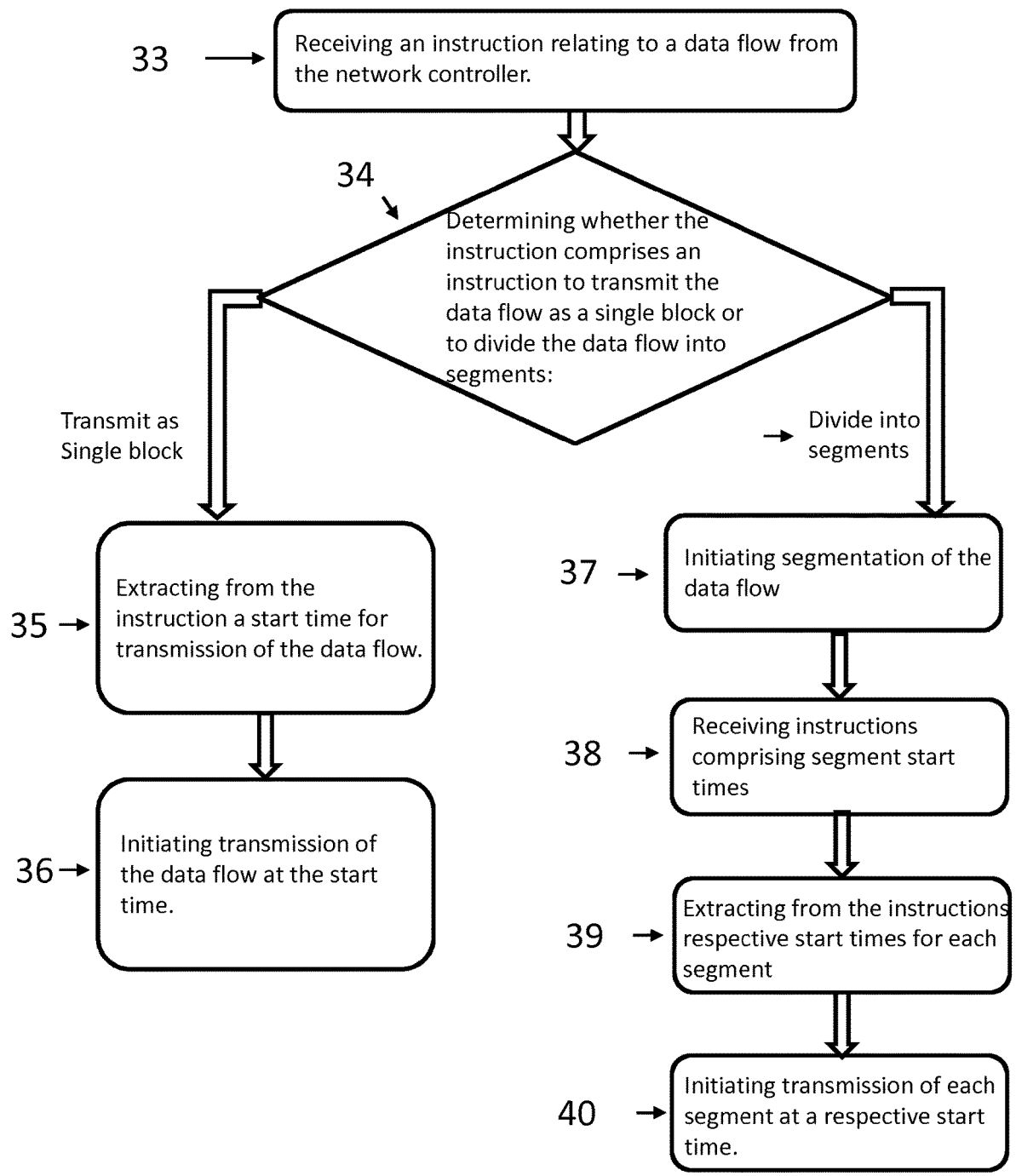
FIG. 7 is a flow chart illustrating a first stage of scheduling data flows according to an embodiment.

FIG. 7 is a flow chart illustrating a method of operating a network node according to an embodiment. The node receives an instruction relating to a data flow from a network controller 33. The method further comprises determining 34 whether the instruction comprises an instruction to transmit the data flow as a single block and if it does, extracting from the instruction a start time for transmission of the data flow 35 and initiating transmission of the data flow at the start time 30. In an embodiment, the method further comprises determining whether the instruction comprises an instruction to divide the data flow into segments 36, and if it does, initiating segmentation of the data flow 37, receiving instructions comprising segment start times 38, extracting from the instructions respective start times for each segment 39 and initiating transmission of each segment at a respective start time 40.

Figure 8:
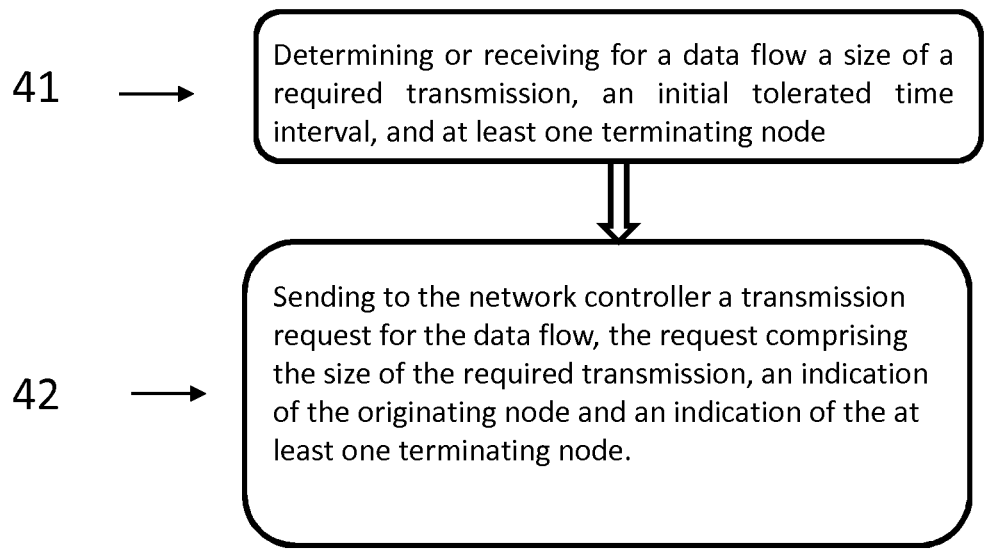
FIG. 8 is a flow chart illustrating a second stage of scheduling data flows according to an embodiment.

FIG. 8 is a flow chart illustrating a method of operating a network node according to an embodiment. The method comprises determining or receiving for a data flow a size of a required transmission and at least one terminating node 41, and sending to the network controller a transmission request for the data flow, the request comprising the size of the required transmission, an indication of the originating node and an indication of the at least one terminating node 42. In an embodiment, the method further comprises determining an initial tolerated time interval and optionally the request further comprises an indication of the initial tolerated time interval.

An example of an instance when the node determines the initial tolerated time interval is if a buffer is at a certain level of filling at a node and the data needs to be transferred within a given time to avoid overflow. An example of when the controller determines the interval is when there is to be a scheduled backup. The person skilled in the art will appreciate that there are many other possibilities both for interval determination at the node and at the controller and the invention is not limited to any particular arrangement for where this determination takes place.

Figure 9:
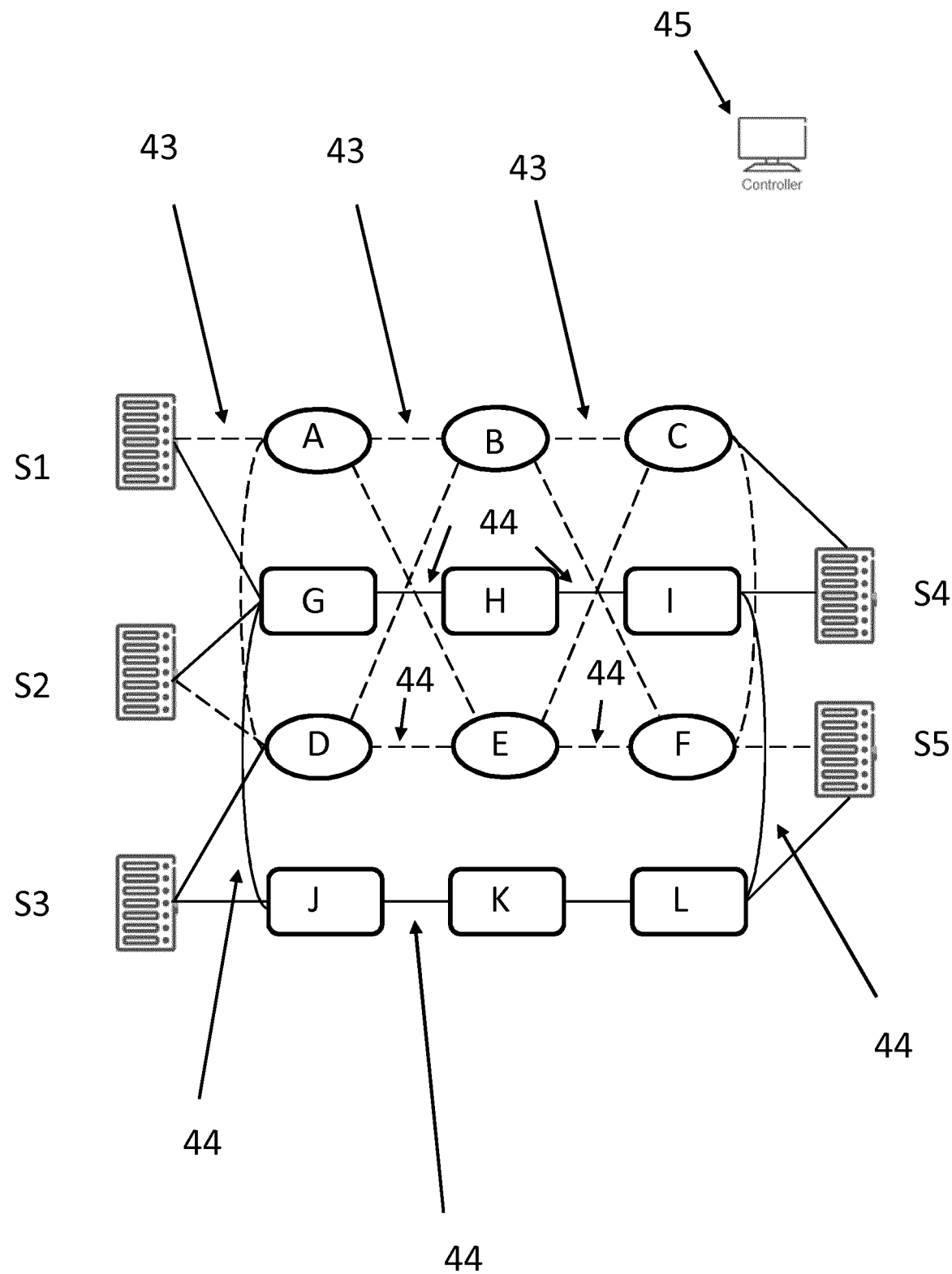
FIG. 9 is a schematic diagram of a data center network as used in an embodiment.

FIG. 9 is a schematic diagram of a data center network as used in an embodiment. A plurality of servers, S1, S2, S3, S4 and S5 are linked by two subnetworks 43, 44, which are controlled by a controller 45. The subnetworks are: a first subnetwork 43 is an optical offload network, provided to allow the offload of high bandwidth flows, and a second subnetwork 44 comprising a conventional data center network with switches and/or routers (e.g. at Layer 2/3). In FIG. 9 the first subnetwork comprises nodes G, H, I, J, K and L and the links between these nodes, which are shown as solid lines. The second subnetwork comprises nodes A, B, C, D, E and F and the links between them are shown as broken lines.

A number of examples of scheduling data flows according to embodiments will now be given. For simplicity only a small number of flows are illustrated, but in practice, larger numbers of flows are likely to be required to be scheduled. The examples are for a single link, but the person skilled in the art will appreciate that the methods may be used on multiple links and nodes for each data flow. The examples are for understanding only and are not intended in any way to limit the scope of the invention.

Figure 10:
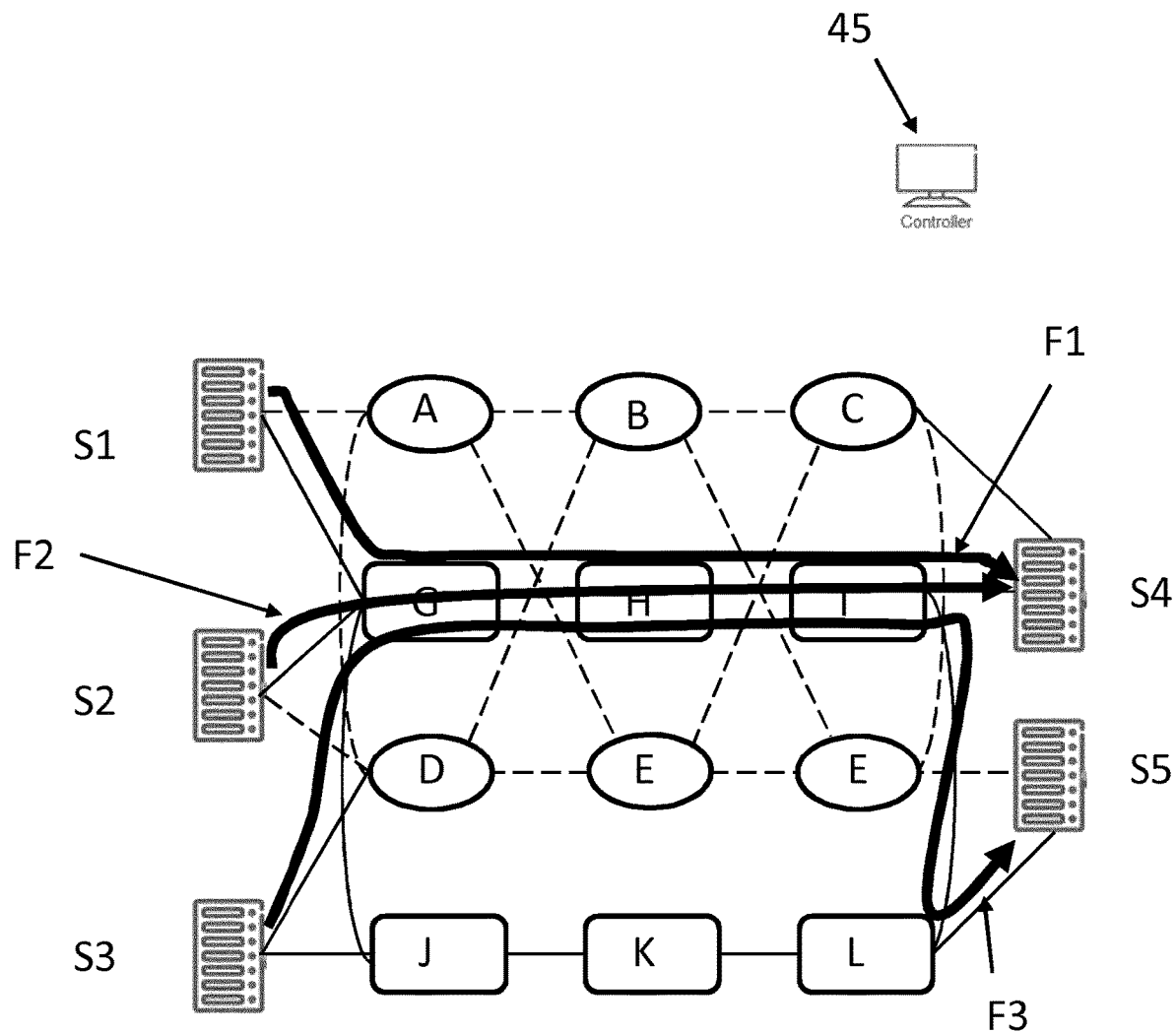
FIG. 10 is a schematic diagram of the data center network of FIG. 9 illustrating the flow of three example data flows of the optical offload subnetwork.

FIG. 10 is a schematic diagram of the data center network of FIG. 9 illustrating the flow of three example data flows of the optical offload subnetwork. The examples focus on the scheduling on the link between node G and node H. The first flow F1 is a data flow which needs to be sent from server S1 to server S4. The initial time interval needs to be "translated" to consider the trip time from the source node to the considered point of the network, i.e. node G in the example. The two borders of the interval are translated of the same time offset. The data flow F1 has an initial tolerated time interval $[T_{1\alpha}, T_{1\beta}]$. The delays which must be added to the interval are the cumulative delay up to the arrival of the flow at node G $[t_{S1G}]$ and the delay for transiting node G $[t_G]$.

These delays are added to the tolerated time interval to produce the tolerated time interval for the transmission of flow F1 on link GH, namely $[T_{1\alpha}+t_{S1G}+t_G, T_{1\alpha}+t_{S1G}+t_G]$. The second flow F2 needs to be sent from server S2 to S4 in the tolerated time interval $[T_{2\alpha}, T_\beta]$. As for F1, the tolerated time interval over link GH is calculated by adding in the delays up to entering node G $[t_{S2G}]$ and the delay through node G $[t_G]$, resulting in a tolerated time interval of $[T_{2\alpha}+t_{S2G}+t_G, T_{2\beta}+t_{S2G}+t_G]$. Flow F3 needs to be transmitted from server S3 to server S5. The delays up to the start of link GH are therefore the delay up to entering node L $[t_{S3L}]$, the delay through node L $[t_L]$, the delay for the link LG $[t_{LG}]$ and the delay through node G $[t_G]$. The tolerated time interval for flow F3 is therefore $[T_{3\alpha}+t_{S3L}+t_L+t_{LG}+t_G, T_{3\beta}+t_{S3G}+t_L+t_{LG}+t_G]$. Tolerated intervals are in general of different durations and can be, in one or more shared resources, partially overlapped.

Figure 11:
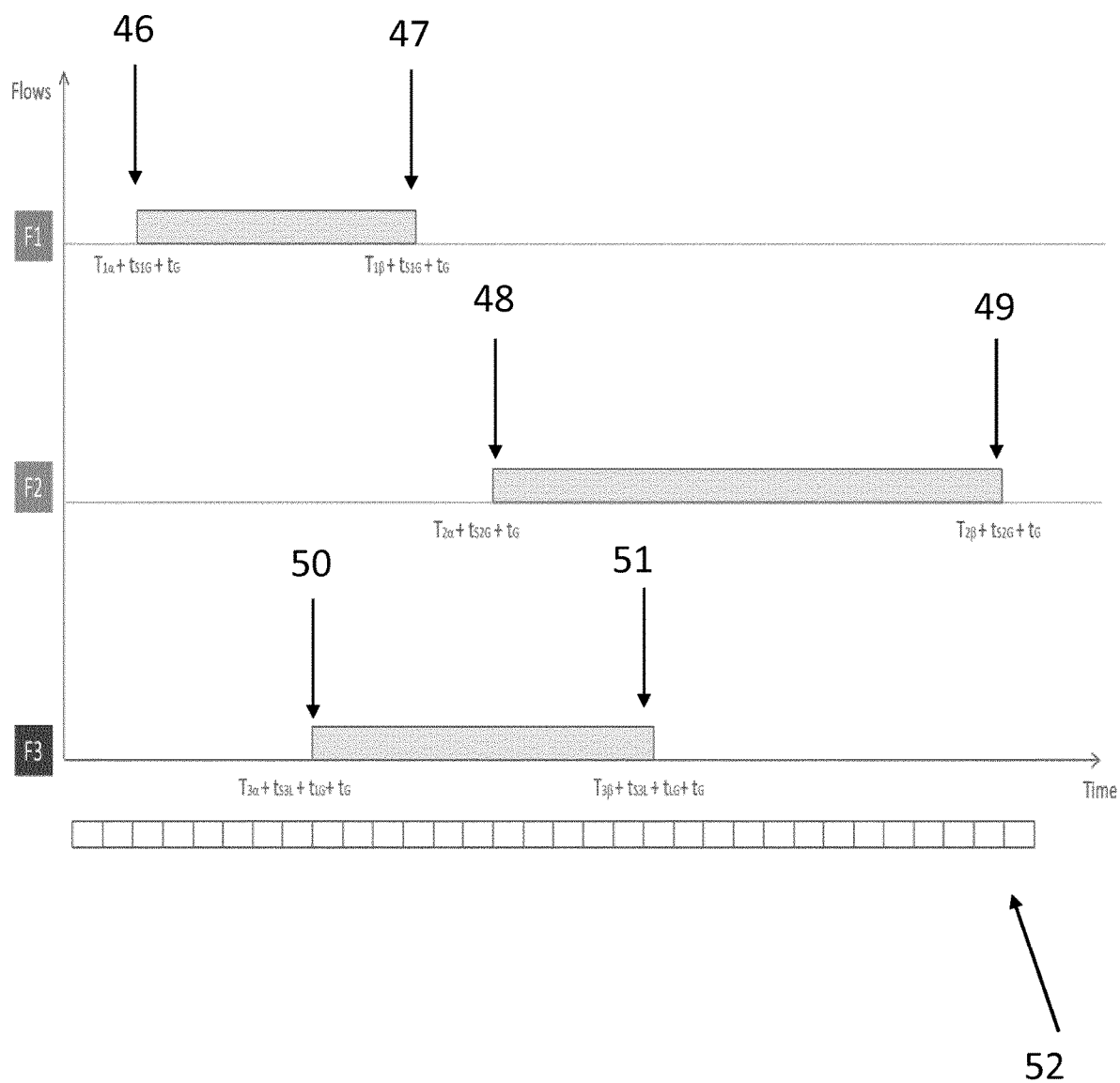
FIG. 11 is a timing diagram showing the tolerated time intervals for three data flows.

FIG. 11 is a timing diagram showing the tolerated time intervals for F1, F2 and F3. The tolerated time interval for F1 is between $[T_{1\alpha}+t_{s1G}+t_G]$ 46 and $[T_{1\beta}+t_{S1G}+t_G]$ 47, the interval for F2 between $[T_{2\alpha}+t_{S2G}+t_G]$ 48 and $[T_{2\beta}+t_{S2G}+t_G]$ 49 and the interval for F3 between $[T_{3\alpha}+t_{S3L}+t_L+t_{LG}+t_G]$ 50 and $[T_{3\beta}+t_{S3G}+t_L+t_{LG}+t_G]$ 51. Transmission of flows is optimized by means of division in time slots 52. In an embodiment, the timeslots are semi-statically pre-assigned by the network controller. The network controller is configured to schedule the plurality of data flows each within their respective tolerated time interval. In some aspects, the network controller calculates, for each data flow, a start time within the tolerated time interval for that data flow, which avoids contention with another data flow.

Figure 12:
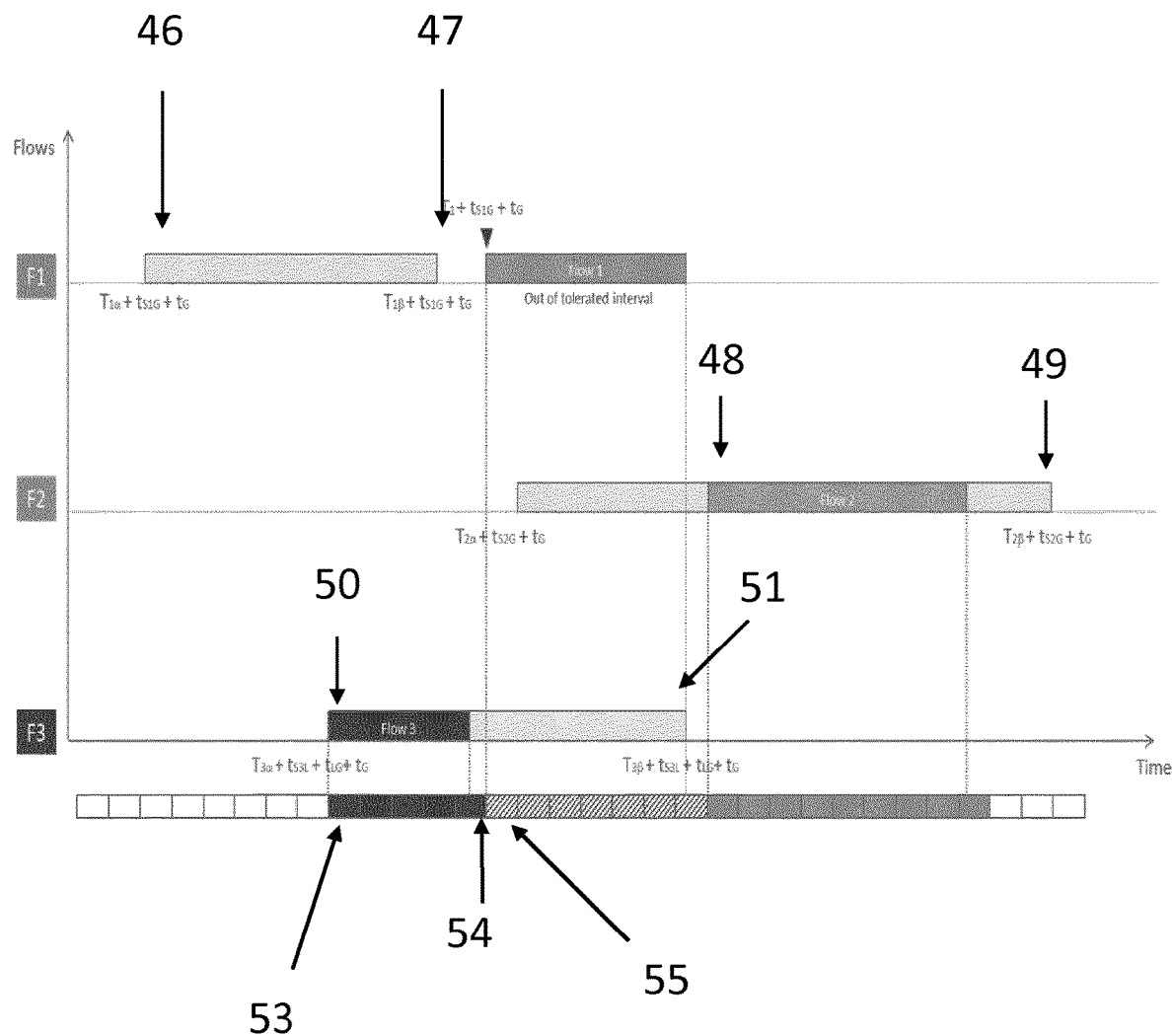
FIG. 12 is a timing diagram illustrating a scheduling option for the tolerated timing intervals of FIG. 11.
Figure 13:
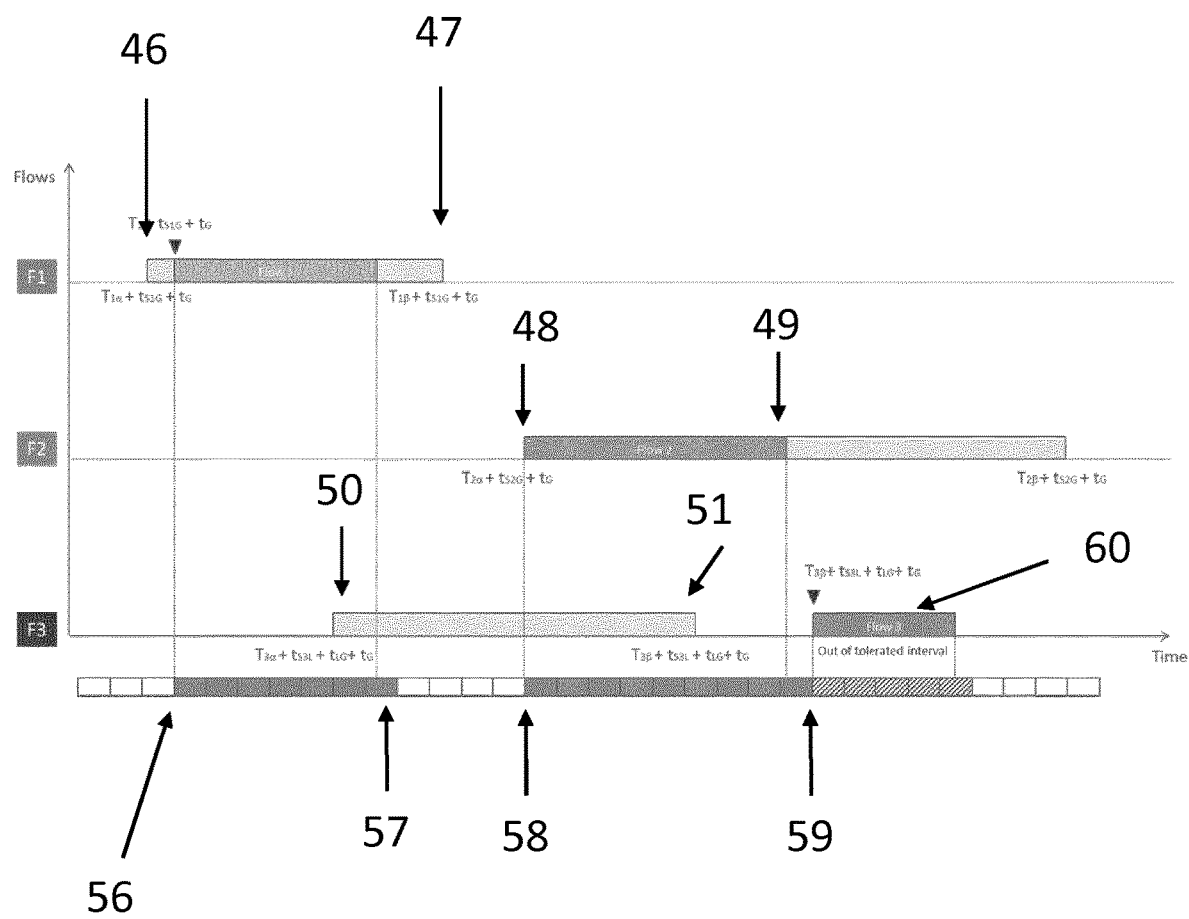
FIG. 13 is a timing diagram illustrating a scheduling option for the tolerated timing intervals of FIG. 11.
Figure 14:
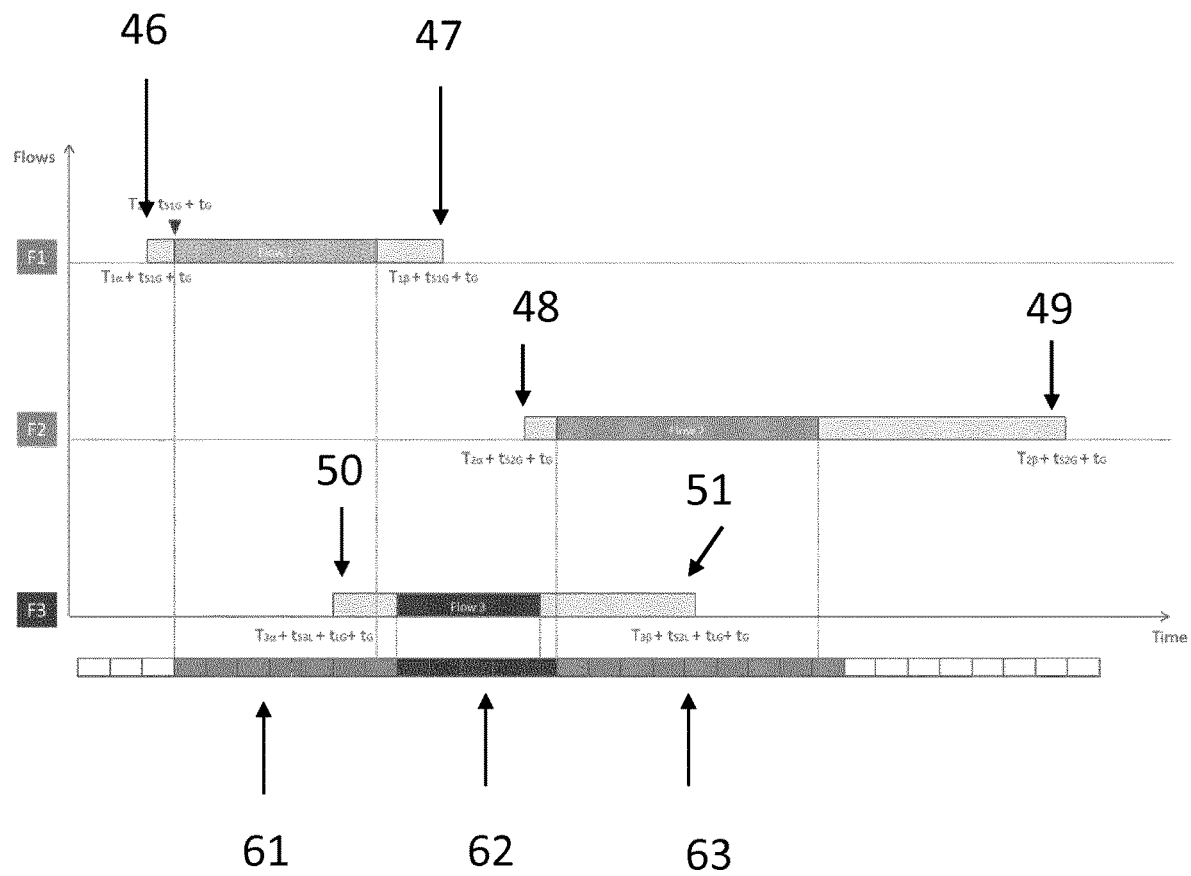
FIG. 14 is a timing diagram illustrating a scheduling option for the tolerated timing intervals of FIG. 11.

FIGS. 12 to 14 are timing diagrams which illustrate options to be considered for the scheduling of the data flows for the example of FIG. 11. FIG. 12 illustrates a schedule with F3 scheduled to be transmitted first. F3 can be scheduled at the earliest at $[T_{3\alpha}+t_{S3L}+t_L+t_{LG}+t_G]$ 50. The five time slots needed for the transmission of F3 are scheduled at the start of the F3 tolerated time interval, with the first slot for F3 being the ninth slot illustrated 53. Transmission of F3 will be completed at the end of the thirteenth slot 54. The fourteenth slot 55, which is the earliest point at which the link GH may be assigned to F1 is after the latest tolerated transmission time for F1 47. Hence the option of transmitting F3 first is not satisfactory. FIG. 13 illustrates the option of transmitting F1 first, flowed by F2 and then F3. The seven slots needed for the transmission of F1 are scheduled from the fourth 56 to the tenth slots 57. F2 is scheduled next, between the fifteenth 58 and the twenty-third slots 59. In this instance however, F3 cannot be transmitted within its required tolerated time interval 60. FIG. 14 illustrates the option of transmitting in the order F1 61, F3 62 and then F2 63. This allows all of the data flows to be transmitted within their tolerated time intervals. The network controller determines the start time, within the tolerated time interval, for each flow to avoid a conflict and provide for all flows to be transmitted within the tolerated time interval.

Figure 15:
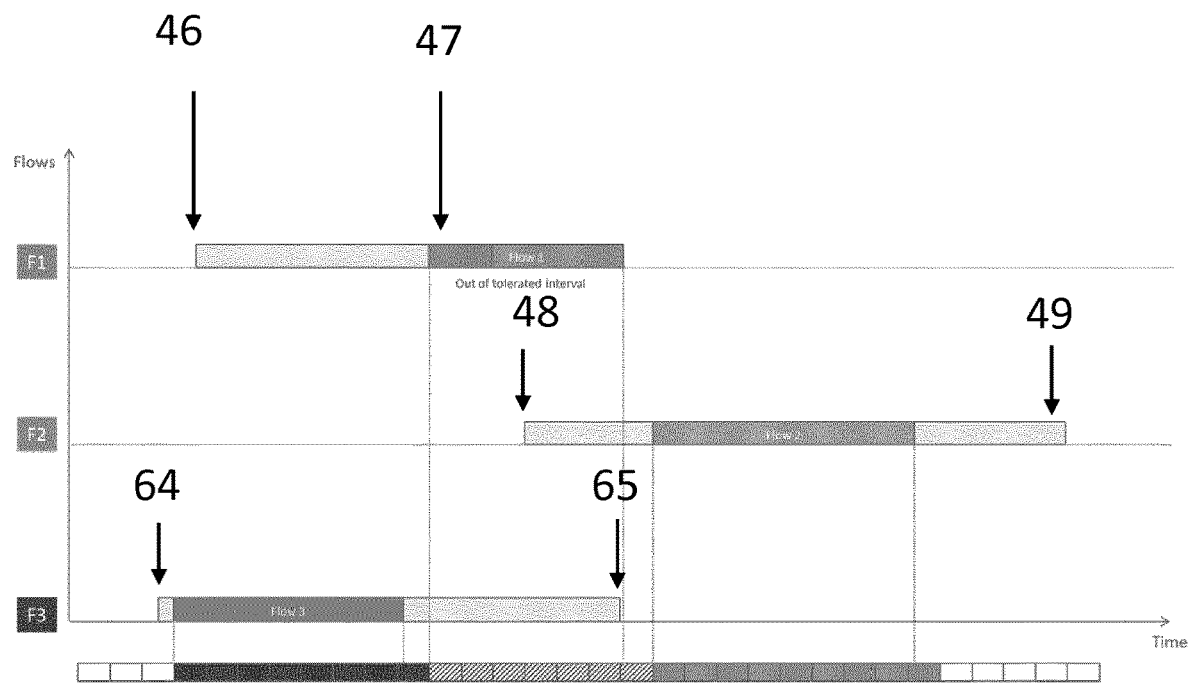
FIG. 15 is a timing diagram for another example of data flow scheduling according to an embodiment.
Figure 16:
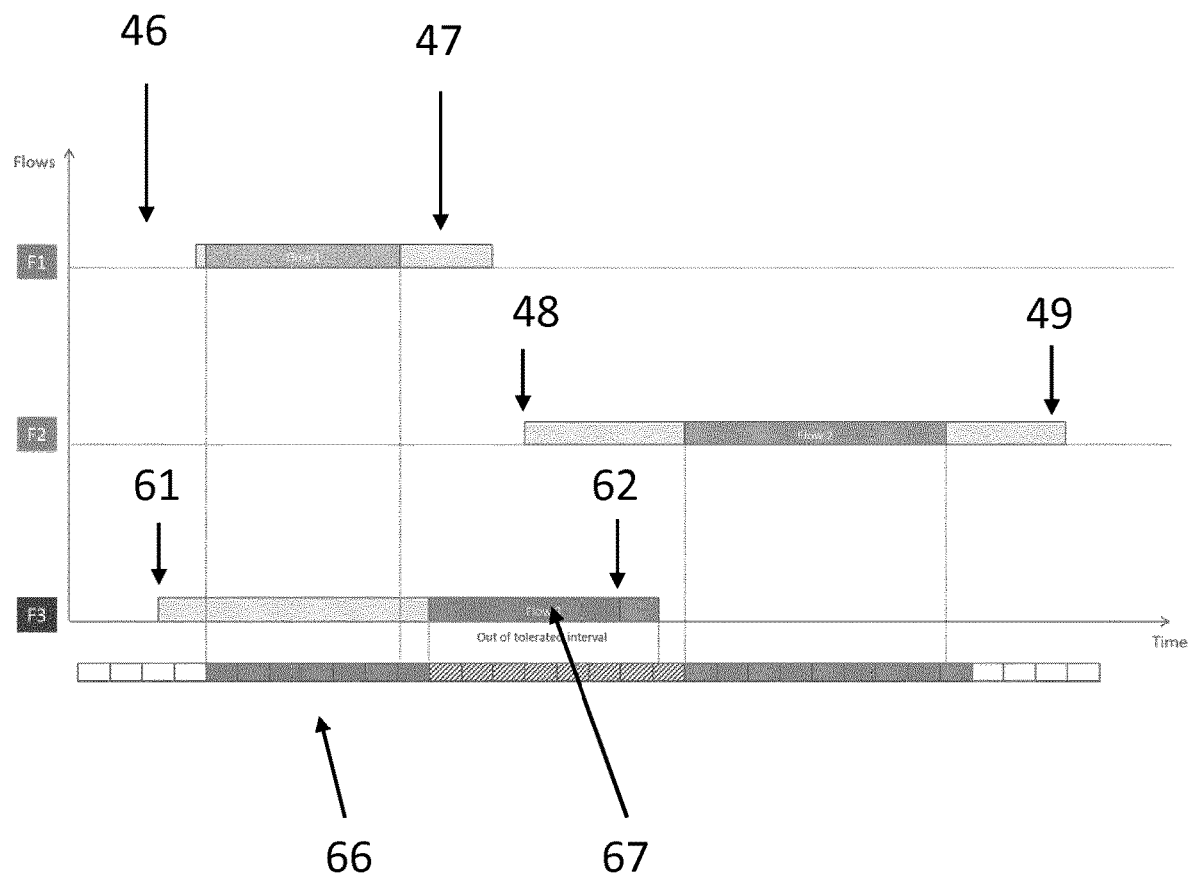
FIG. 16 is a timing diagram illustrating a scheduling option for the tolerated timing intervals of FIG. 15.
Figure 17:
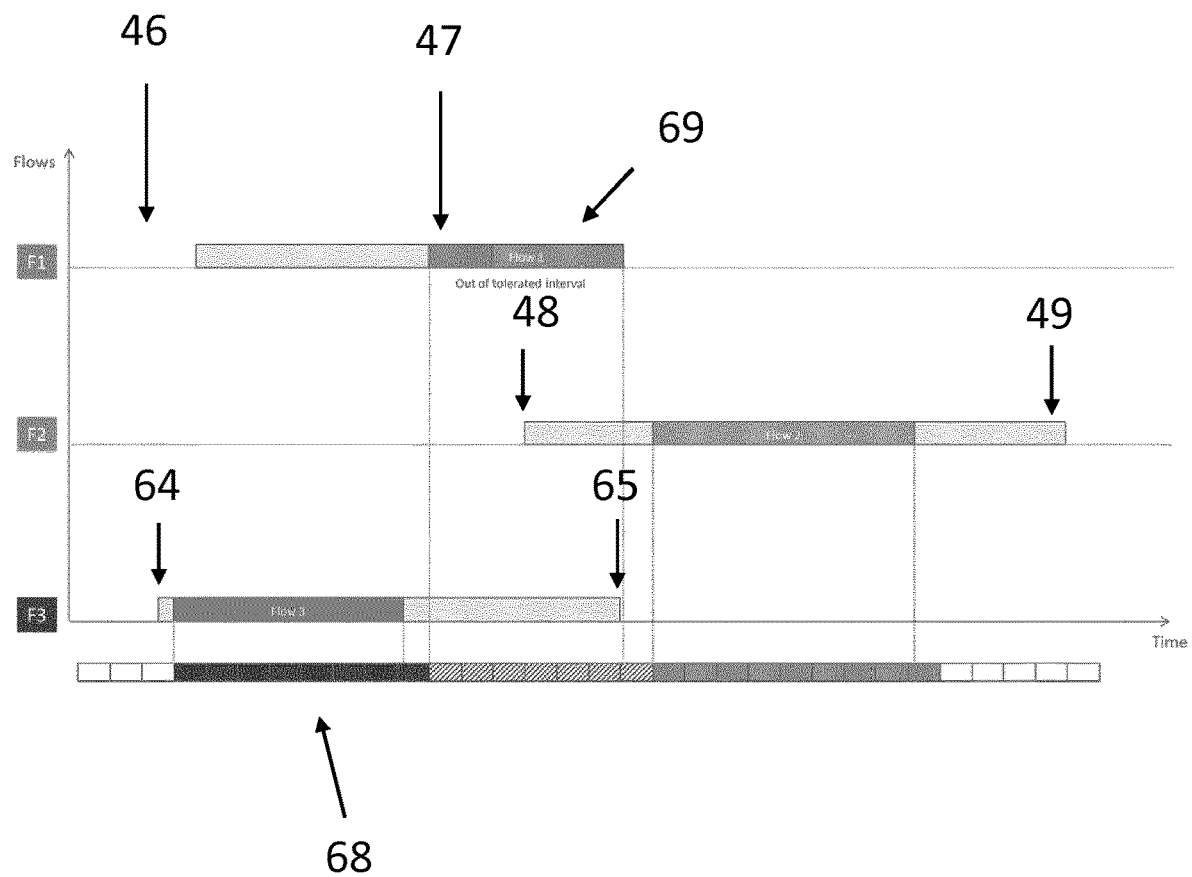
FIG. 17 is a timing diagram illustrating a scheduling option for the tolerated timing intervals of FIG. 15.
Figure 18:
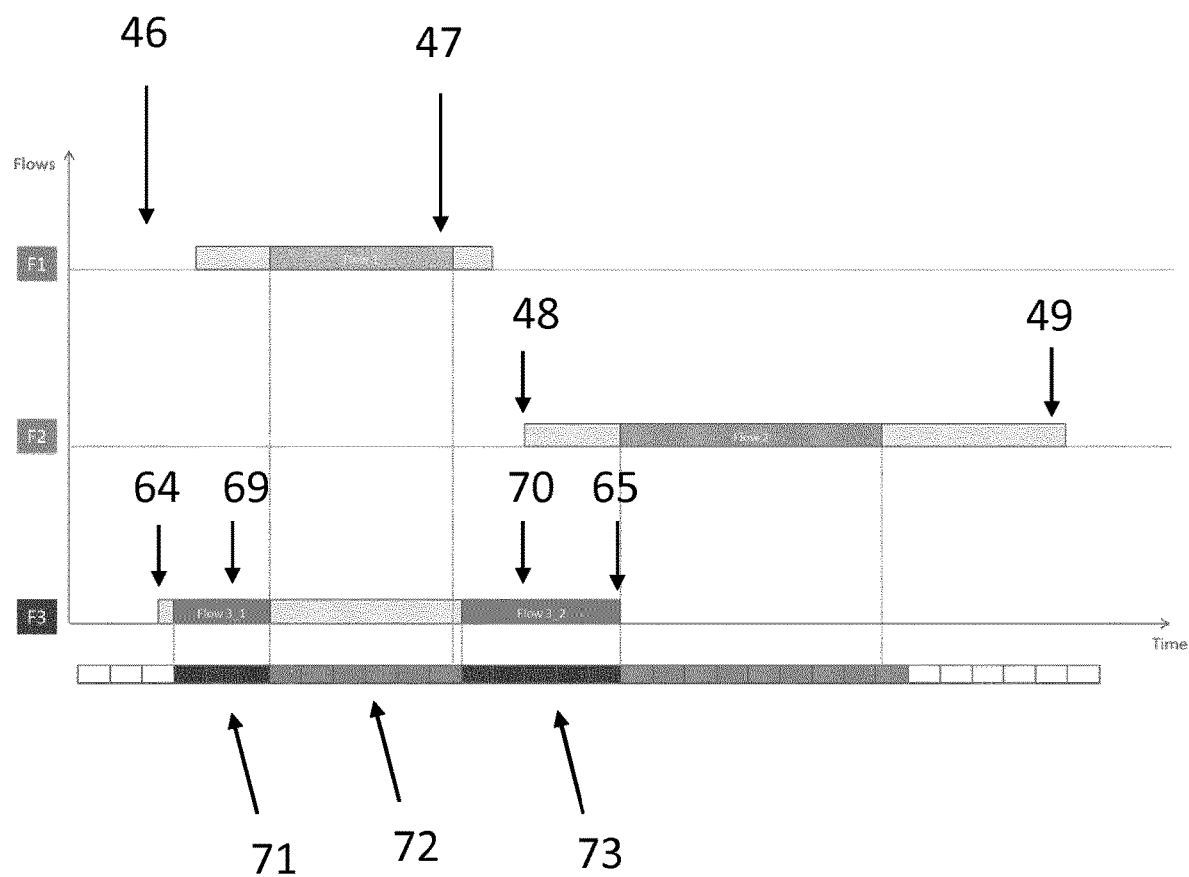
FIG. 18 is a timing diagram illustrating a scheduling option for the tolerated timing intervals of FIG. 15.

FIG. 15 is a timing diagram for another example of data flow scheduling according to an embodiment. In this example, the tolerated time intervals for F1 and F2 are the same as for the previous example, but F3 now has an earlier tolerated time interval 64, 65. In this example, F1 cannot be transmitted after F3, but neither can F3 be transmitted after F1. FIGS. 16 and 17 are timing diagrams which illustrate these two options with their associated problems. In FIG. 16, F1 is transmitted first 66 and the result is that F3 cannot be transmitted 62 within its tolerated time interval 67. In FIG. 17, F3 is transmitted first 68 and the result is that F1 69 cannot be transmitted within its tolerated time interval. In an embodiment, data flows can be divided into segments to enable scheduling of transmission within the tolerated time intervals. A solution to the problem illustrated in FIGS. 15 to 17 is to segment flow F3. FIG. 18 is a timing diagram which illustrates this solution, which is determined by the network controller. F3 is divided into a plurality of segments, e.g. two segments F3_1 69 and F3_2 70. F3_1 is scheduled first 71, followed by F1 72 and then by F3_2 73. The segments for the segmented data flow are separated in time, allowing another data flow to be transmitted in that separation time. This enables both F1 and F3 to be transmitted within their tolerated time intervals.

In an embodiment, high bandwidth flows may be transmitted on either the first subnetwork, as in the examples above, or else on either the first or the second subnetworks, depending on the availability of network resources. If a high bandwidth flow is transmitted on the conventional subnetwork, potential contention may occur with low bandwidth flows which also use this subnetwork.

Figure 19:
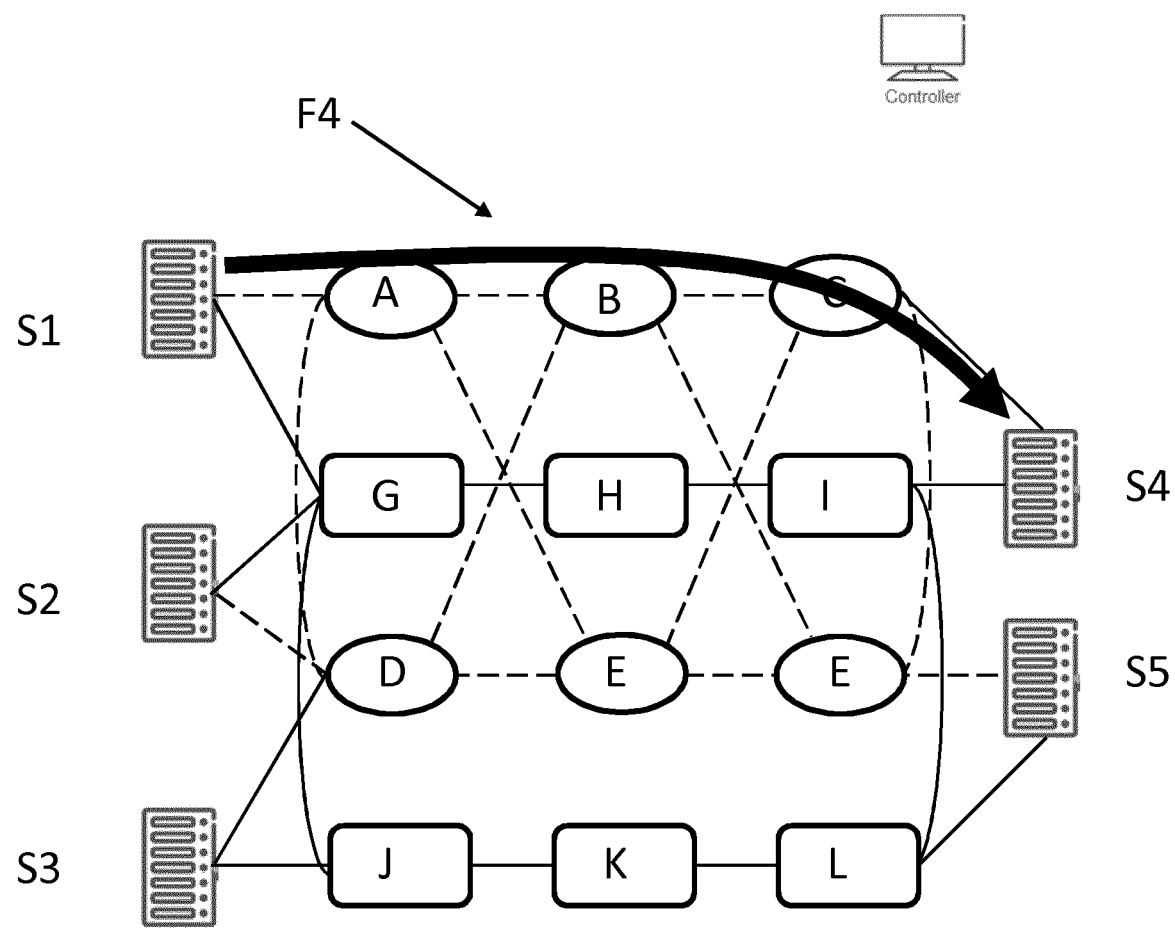
FIG. 19 is a schematic diagram illustrating a flow which is to be transmitted on the conventional subnetwork.

FIG. 19 is a schematic diagram illustrating a flow F4 which is to be transmitted on the conventional subnetwork. Flow F4 needs to be transmitted from server S1 to server S4. In this example, flow F4 is scheduled for transmission on the second subnetwork, i.e. the conventional subnetwork. This may be due to the optical offload subnetwork being already loaded with scheduled high bandwidth flows. The scheduling in the conventional subnetwork works in a manner similar to that for the optical offload network, in that delays at nodes and for links are calculated and a tolerated time interval for each link is calculated for a data flow. A determination is then made as to whether the data flow can be scheduled without contention, either as a single block or in segments. However, unlike in the previous examples, allowance must be made for low bandwidth flows arriving during the transmission of flow F4. The low bandwidth flows may not be scheduled, but still have delay tolerances which must be met.

In order to achieve this, the high bandwidth flow is divided into segments and a guard period is inserted between the segments. A guard period is a time period in which no data flow is scheduled to be transmitted. It has the purpose of either to prevent overlaps in data flows in the event of synchronization errors or to allow the transmission of non-scheduled data, such as "mice" flows. The guard period can be calculated based on the estimated number of mice flows that may collide on the aggregated links e.g. in the order of few tens of microseconds, assuming 10 KB as mice flow average dimension and 10 Gbps as link rate. These values are given as examples and the invention is not limited to any given sizes of data flows or link rates.

Figure 20:
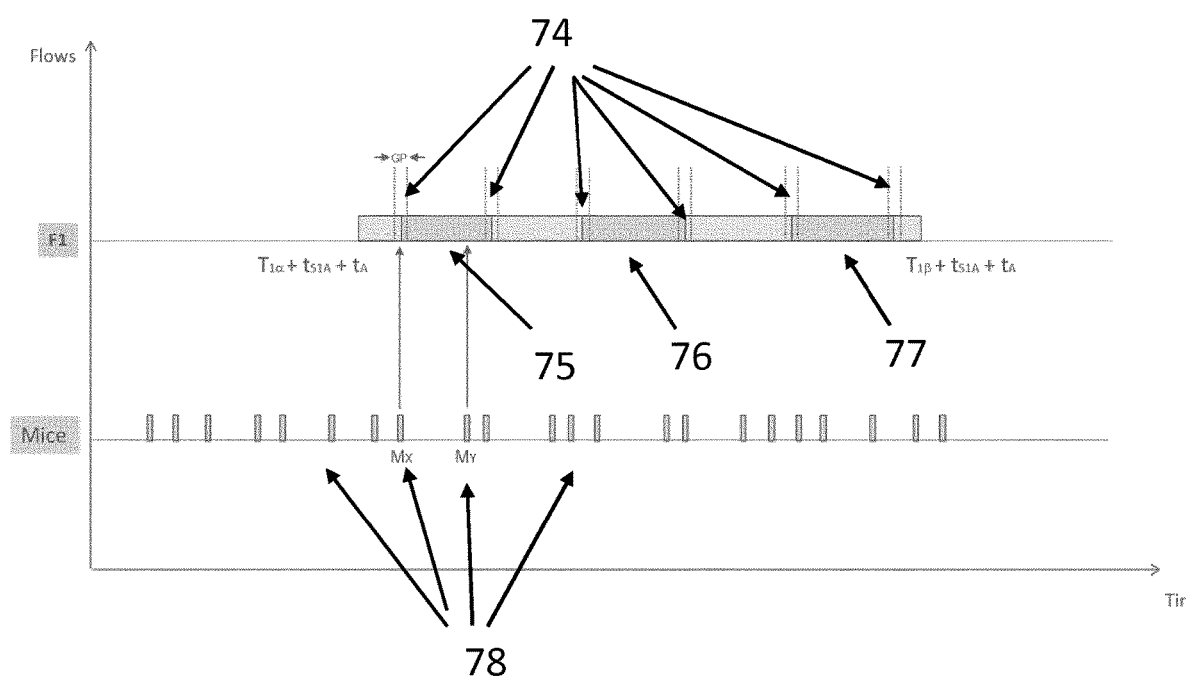
FIG. 20 is a timing diagram illustrating the scheduling of a flow with guard periods according to an embodiment.

FIG. 20 is a timing diagram illustrating the scheduling of F4 with guard periods 74, e.g. to allow for low bandwidth flows 78. The tolerated time interval for the flow across the link is calculated as before. In this example, the time interval is calculate for the link AB. The initial tolerated time period $[T_{4\alpha}, T_{4\beta}]$ is added to the delay between server S1 and node A $[t_{S1A}]$, and the delay through node A $[t_A]$ to reach a tolerated time interval for link AB of $[T_{4\alpha}+t_{S1A}+t_A, T_{4\beta\alpha}+t_{S1A}+t_A]$. In the example, flow F4 is divided into three segments 75, 76, 77. In this embodiment however, flow F4 is divided in segments and guard periods are scheduled between segments. Low bandwidth flows may then be transmitted in the guard periods, enabling them to meet required delay requirements. In an embodiment, guard periods may also be used in an optical offload subnetwork.

Figure 21:
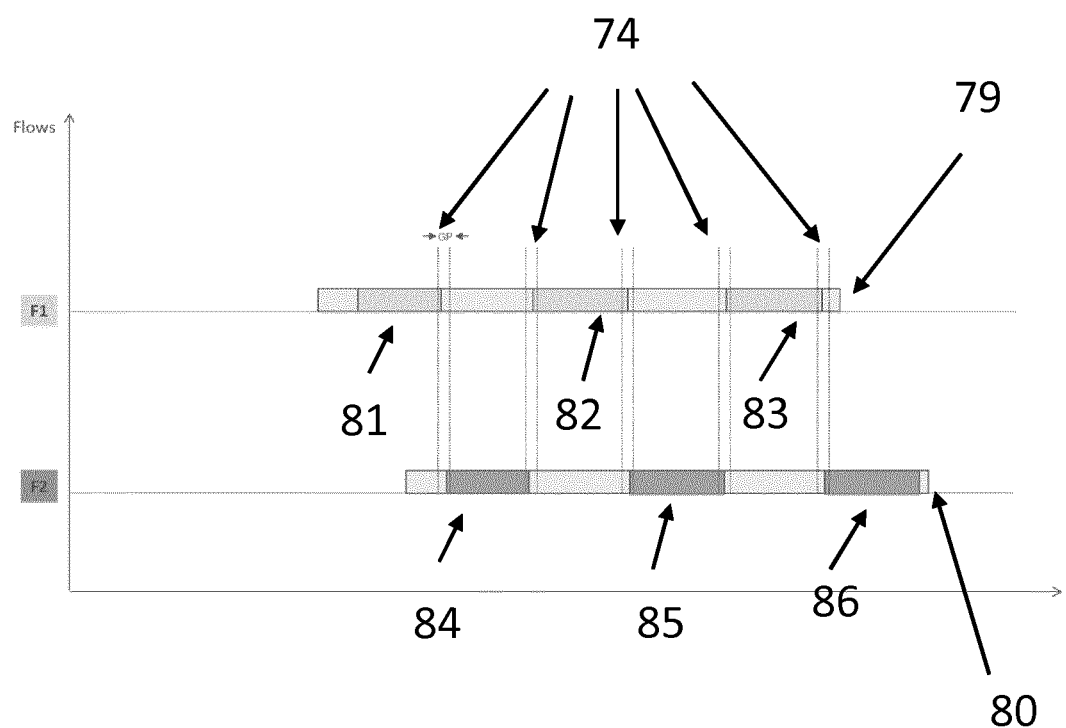
FIG. 21 is a timing diagram illustrating an example in which two high bandwidth flows are scheduled with guard periods according to an embodiment.

FIG. 21 is a timing diagram illustrating an example in which two high bandwidth flows F5 79 and F6 80 are scheduled on a conventional subnetwork. F5 is divided into three segments 81, 82, 83, as is F6 84, 85, 86. Guard periods 74 are inserted between segments. In an embodiment, guard periods are also inserted either side of data flows or segments of data flows in either or both the conventional subnetwork and the optical offload network in order to compensate for timing errors between the servers. For this purpose, accuracy in the order of microseconds is required.

In an embodiment, the length of the guard period is estimated based on statistical analysis of low bandwidth flows. In particular, the expected and actual number of collisions may be compared. A notification is sent to the controller if the predicted number of collisions is exceeded and the guard period is not sufficient. The controller can force the source server to organize the remaining part of a data flow with a larger guard period.

Figure 22:
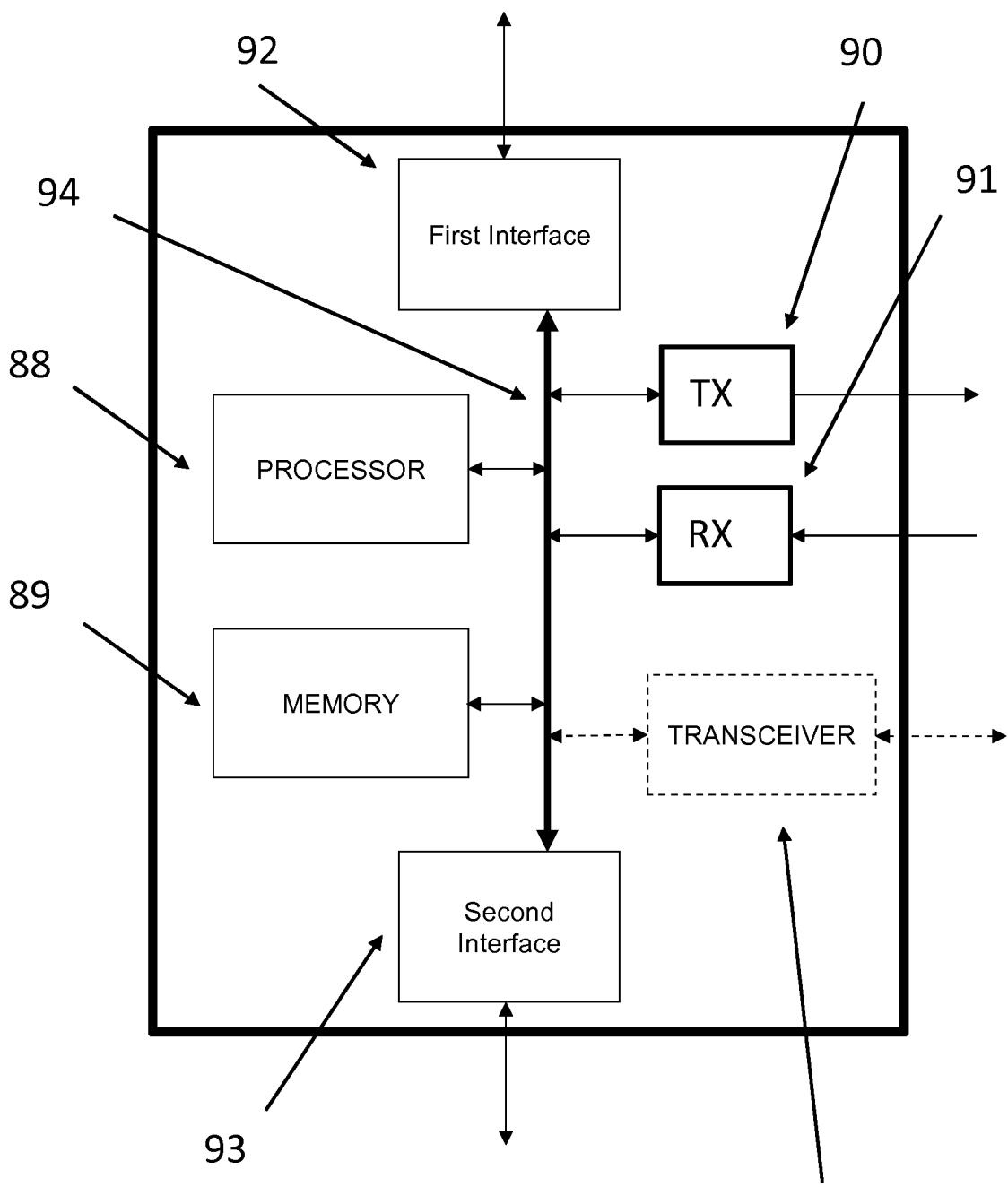
FIG. 22 is a schematic diagram illustrating an apparatus for use in a network node according to an embodiment.

FIG. 22 is a schematic diagram illustrating the components of an apparatus 87 for use in a network node according to an embodiment. The apparatus comprises a processor 88 or processing circuitry, a memory 89 or memory circuitry, a transmitter 90 for transmitting data to a subnetwork of a data center network, a receiver 91 for receiving data from the communications network, a first interface 92 for exchanging data with at least one data source, a second interface 93 for exchanging control data with a network controller and a data bus 94 for communication between the components. The apparatus is configured to receive an instruction relating to a data flow from the network controller. The apparatus is further configured such that, if the instruction comprises an instruction to transmit the data flow as a single block, the apparatus extracts from the instruction a start time for transmission of the data flow and initiates transmission of the data flow at the start time. In an embodiment, the apparatus is yet further configured such that, if the instruction comprises an instruction to divide the data flow into segments, the apparatus initiates division of the data flow into segments, receives instructions comprising segment start times, extracts from the instructions respective start times for each segment, and initiates transmission of each segment at a respective start time. In an embodiment, the apparatus is further configured to determine or receive a size of a required transmission, an initial tolerated time interval and at least one terminating node for a data flow, and send to the network controller a transmission request for the data flow, the request comprising the size of the required transmission, the initial tolerated time interval, an indication of the originating node and an indication of the at least one terminating node.

In an embodiment, there is further provided a transceiver 95 for connection to a second subnetwork. In an embodiment, the apparatus is further configured to receive an instruction to transmit a data flow on the second communications network, and in response to receipt of the instruction initiate transmission on the second network.

In an embodiment, the apparatus is further configured to insert a guard band prior to transmission of a data flow or a segment of a data flow.

Figure 23:
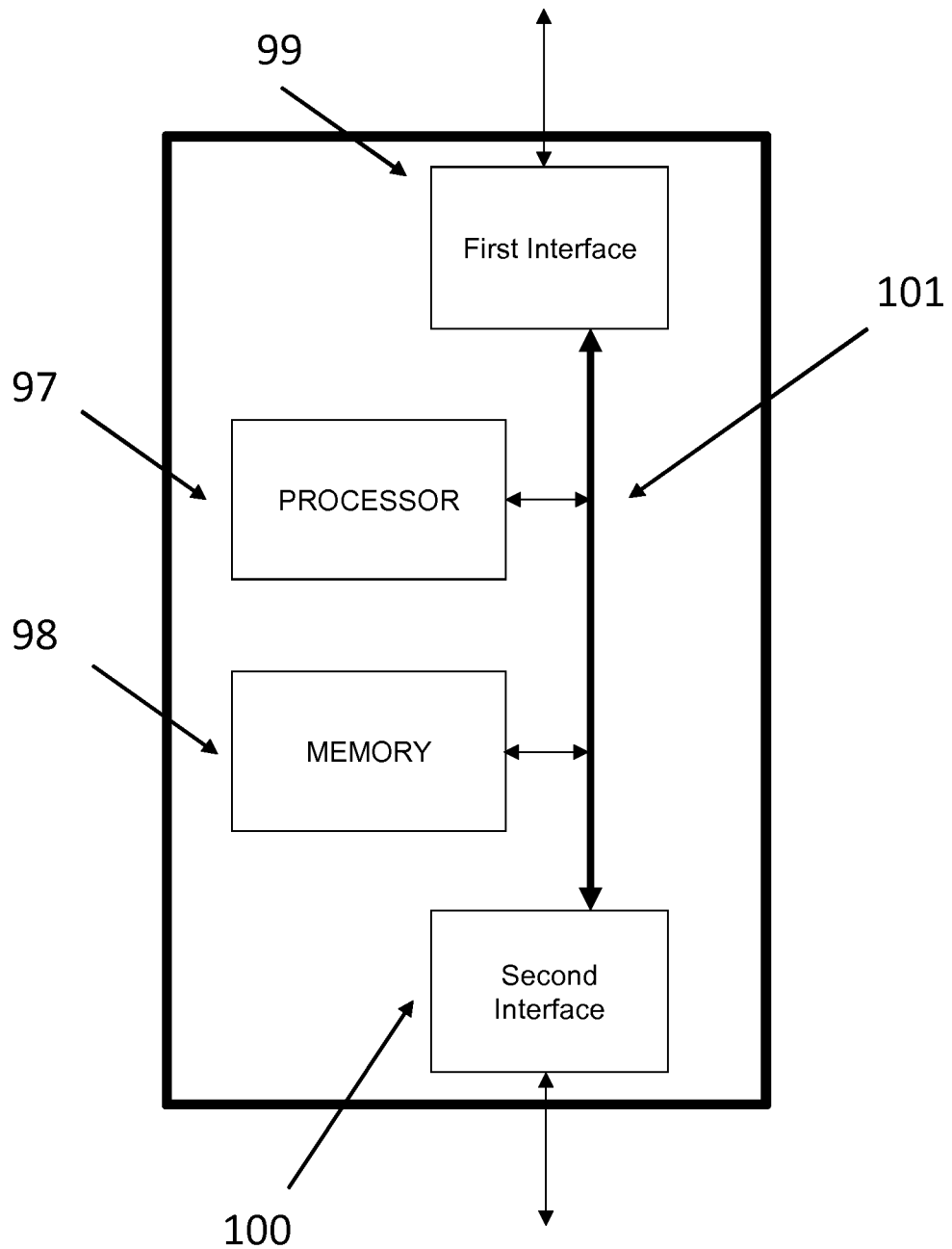
FIG. 23 is a schematic diagram of a network controller according to an embodiment.

FIG. 23 is a schematic diagram of a network controller 96 according to an embodiment. The network controller comprises a processor 97, a memory 98, a first interface 99 for receiving requests for transmission of a data flow, a second interface 100 for transmitting instructions for transmission of a data flow and a data bus 101 for communication between the components. In an embodiment, the network controller is configured to receive a transmission request for a data flow, obtain a tolerated time interval for the data flow, and schedule transmission of the data flow within the tolerated time interval and without contention with one or more other transmissions.

In an embodiment, the network controller is further configured to identify the originating node and terminating node of a data flow, identify a set of the nodes and a set of links, through which the data flow must pass, determine the delays associated with the nodes and links between the nodes, determine a tolerated time interval for the data flow for each link and node in the set of links, the determining based on the delays associated with the nodes and links, and an initial tolerated time interval for the data flow and schedule the transmission of the data flow at each link and node based on the tolerated time interval for the link and the size of the transmission.

In an embodiment, the network controller is further configured to schedule transmission based on a division of the data flow into a plurality of segments. In an embodiment, the network controller is further configured to schedule guard periods between the data flow or the segments of the data flow and other data flows on the communications network. In an embodiment, the network controller is further configured to determine a path for the data flow through the network to avoid contention with one more other data flows.

Figure 24:
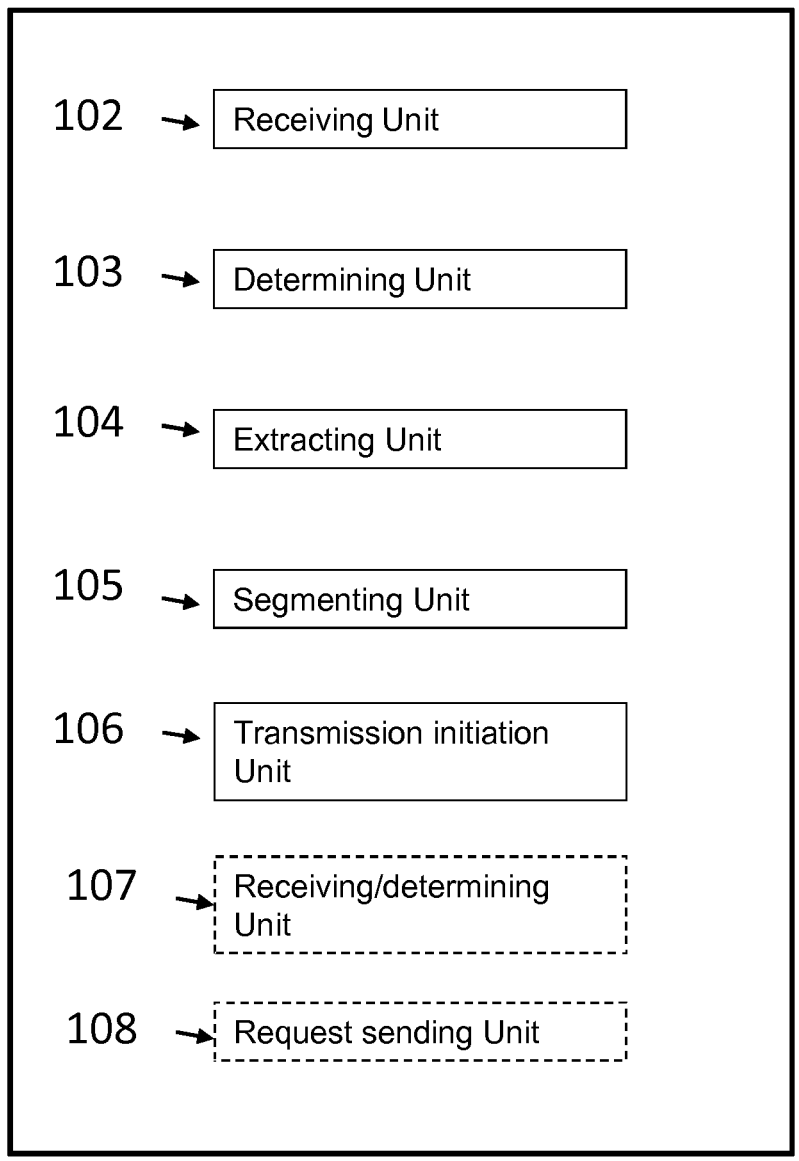
FIG. 24 is a schematic diagram illustrating the logical units of an apparatus for use in a network node 82 according to an embodiment.

FIG. 24 is a schematic diagram illustrating the logical units of an apparatus for use in a network node 87 according to an embodiment. The apparatus comprises a receiving unit 102, for receiving an instruction relating to a data flow from a network controller, a determining unit 103 for determining whether the instruction comprises an instruction to transmit a data flow as a single block and for determining whether the instruction comprises an instruction to divide the data flow into segments, an extracting unit 104, for extracting from the instruction a start time for transmission of the data flow or segments of the data flow, a segmenting unit 105, for initiating segmentation of the data flow and a transmission initiation unit 106 for initiating transmission of the data flow at the start time or each segment of the data flow at a respective start time.

In an embodiment, the apparatus further comprises a receiving/determining unit 107 for determining or receiving for a data flow a size of a required transmission, an initial tolerated time interval, and at least one terminating node, and a request sending unit 108 for sending to the network controller a transmission request for the data flow, the request comprising the size of the required transmission, the initial tolerated time interval indication, an indication of the originating node and an indication of the at least one terminating node.

Figure 25:
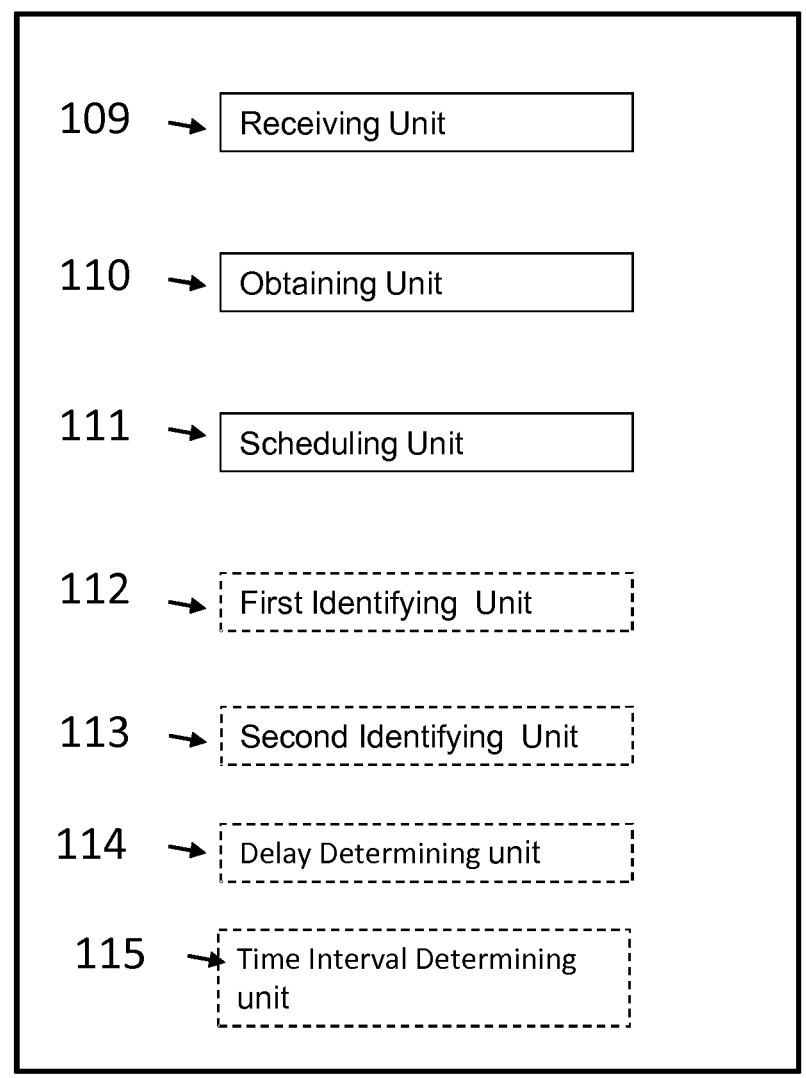
FIG. 25 is a schematic diagram illustrating the logical units of a network controller according to an embodiment.

FIG. 25 is a schematic diagram illustrating the logical units of a network controller 96 according to an embodiment. The network controller comprises a receiving unit 109 for receiving a transmission request for a data flow, an obtaining unit 110, for obtaining a tolerated time interval for the data flow, and a scheduling unit 111, for scheduling transmission of the data flow within the tolerated time interval and without contention with one or more other transmissions. In an embodiment, there is further provided an first identifying unit 112, for identifying the originating node and terminating node of a data flow, a second identifying unit 113, for identifying a set of the nodes and a set of links, through which the data flow must pass, a delay determining unit 114 for determining the delays associated with the nodes and links between the nodes and a time interval determining unit 115 for determining a tolerated time interval for the data flow for each link and node in the set of links, the determining based on the delays associated with the nodes and links, and an initial tolerated time interval for the data flow.

In order to implement the method herein disclosed, instructions may be provided in the form of a computer programs downloadable to the network nodes or controller. This may be in the form of a computer program product, typically contained on a carrier such as an electrical signal, an optical signal, a radio signal, a magnetic tape or disk, an optical disk or a memory stick.

The present disclosure has mainly been described above with reference to a few embodiments. However, as is readily appreciated by a person skilled in the art, other embodiments than the ones disclosed above are equally possible within the scope of the present disclosure, as defined by the appended claims. References to a required transmission may alternatively be considered as a requested transmission.

The invention claimed is:

1. A method of scheduling transmission of a data flow in a data center network comprising a plurality of network nodes and links, the method comprising, at a network controller:
   receiving a transmission request for a data flow,
   obtaining a tolerated time interval for the data flow,
   scheduling transmission of the data flow within the tolerated time interval and without contention with one or more other scheduling transmissions on the data center network, wherein scheduling transmission of the data flow comprises:
      determining whether at least starting time exists within the tolerated time interval for which the data flow may be transmitted as a single block without contention with the one or more other scheduling transmissions on the data center network;
      transmitting the data flow at the first acceptable starting time when at least one starting time is determined to exist within the tolerated time interval for which the data flow may be transmitted as a single block without contention with the one or more other scheduling transmissions on the data center network; and
      enabling a client server to segment the data flow into macro time slots when at least one starting time is determined to not exist within the tolerated time interval for which the data flow may be transmitted as the single block without contention with the one or more other scheduling transmissions on the data center network, and
   scheduling the transmission of data flow such that the data flow or segments of the data flow are separated by one or more guard periods from another data flow on the data center network, wherein the data flow is a high bandwidth flow, wherein the high bandwidth data flow is a data flow with a bandwidth requirement greater than a threshold, wherein the guard period is dimensioned to allow for transmission of low bandwidth flows, wherein a low bandwidth flow is a data flow with a bandwidth below the threshold.

2. A method according to claim 1, further comprising:
   identifying an originating node and terminating node;
   identifying a set of the nodes and a set of links, through which the data flow is to be routed;
   determining delays associated with the nodes and links between the nodes;
   determining a tolerated time interval for the data flow for each link and node in the set of links, the determining based on the delays associated with the nodes and links, and an initial tolerated time interval at the client server for the data flow; and scheduling the transmission of the data flow at each link and node based on the tolerated time interval for the link.

3. A method according to claim 1, wherein the transmission request comprises an indication of a size of a required transmission, an initial tolerated time interval, an indication of originating node and an indication of at least one terminating node.

4. A method according to claim 1, wherein scheduling transmission of the data flow comprises determining a division of the data flow into a plurality of segments for transmission of the data flow within the tolerated time interval and without contention.

5. A method according to claim 1, further comprising determining a path through the network to avoid contention with other data flows.

6. A method according to claim 1, wherein the data center network comprises an optical offload subnetwork and scheduling data flows on the optical offload subnetwork is implemented.

7. A method according to claim 1 wherein the data center network comprises a second subnetwork comprising at least one switch or router, wherein the method further comprises scheduling the data flow on the second subnetwork if no scheduling without contention is possible on the optical offload subnetwork.

8. A method according to claim 1, further comprising, at a network node:
receiving an instruction relating to the data flow from the network controller; and
determining whether the instruction comprise an instruction to transmit the data flow as a single block and if the instructions comprise the instruction to transmit the data flow as a single block:
extracting from the instruction a start time for transmission of the data flow; and
initiating transmission of the data flow at the start time; and
determining whether the instruction comprise an instruction to divide the data flow into segments and if the instructions comprise an instruction to divide the data flow into segments:
initiating segmentation of the data flow; and
receiving instructions comprising segment start times;
extracting from the instruction respective start times for each segment; and
initiating transmission of each segment at a respective start time.

9. A method according to claim 8 further comprising:
determining a size of a required transmission, an initial tolerated time interval, and at least one terminating node; and
sending to the network controller a transmission request for a data flow, the request comprising the size of the required transmission, an indication of the initial tolerated time interval, an indication of the originating node and an indication of the at least one terminating node.

10. A network controller for a communications network comprising: a first interface for receiving requests for transmission of a data flow;
a second interface for transmitting instructions for transmission of a data flow;
a processor; and
the processor being configured to:
receive a transmission request for a data flow,
obtain a tolerated time interval for the data flow,
schedule transmission of the data flow within the tolerated time interval and without contention with other scheduling transmissions, wherein scheduling transmission of the data flow comprises:
determining whether at least starting time exists within the tolerated time interval for which the data flow may be transmitted as a single block without contention with the one or more other scheduling transmissions on the data center network;
transmitting the data flow at the first acceptable starting time when at least one starting time is determined to exist within the tolerated time interval for which the data flow may be transmitted as a single block without contention with the one or more other scheduling transmissions on the data center network, and
enabling a client server to segment the data flow into macro time slots when at least one starting time is determined to not exist within the tolerated time interval for which the data flow may be transmitted as the single block without contention with the one or more other scheduling transmissions on the data center network, and
schedule guard periods between the data flow or segments of the data flow and other data flows on the communications network, wherein the data flow is a high bandwidth flow, wherein the high bandwidth data flow is a data flow with a bandwidth requirement greater than a threshold, wherein the guard period is dimensioned to allow for transmission of low bandwidth flows, wherein a low bandwidth flow is a data flow with a bandwidth below the threshold.

11. A network controller according to claim 10, further configured to:
identify an originating node and terminating node;
identify a set of the nodes and a set of links, through which the data flow is to be routed;
determine delays associated with the nodes and links between the nodes;
determine a tolerated time interval for the data flow for each link and node in the set of links, the determining based on the delays associated with the nodes and links, and an initial tolerated time interval for the data flow; and
schedule the transmission of the data flow at each link and node based on the tolerated time interval at the client server for the link and the size of the transmission.

12. A network controller according to claim 10, further configured to schedule transmission based on a division of the data flow into a plurality of segments.

13. A network controller according to claim 10, further configured to determine a path for the data flow through the network to avoid contention with other data flows.

14. A communications network comprising a network controller according to claim 10.

* * * * *